(12) United States Patent
Kim et al.

(10) Patent No.: US 12,311,739 B2
(45) Date of Patent: May 27, 2025

(54) HEAT PUMP SYSTEM FOR VEHICLE

(71) Applicants: Hyundai Motor Company, Seoul (KR); Kia Corporation, Seoul (KR)

(72) Inventors: Jae Yeon Kim, Hwaseong-si (KR); Wan Je Cho, Hwaseong-si (KR); Seong-Bin Jeong, Hwaseong-si (KR); Yeonho Kim, Seoul (KR); Jeawan Kim, Hwaseong-si (KR); Hoyoung Jeong, Daegu (KR); Man Hee Park, Suwon-si (KR); Hochan An, Hwaseong-si (KR); Tae Hee Kim, Asan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 311 days.

(21) Appl. No.: 18/065,473

(22) Filed: Dec. 13, 2022

(65) Prior Publication Data

US 2024/0034129 A1 Feb. 1, 2024

(30) Foreign Application Priority Data

Jul. 29, 2022 (KR) ........................ 10-2022-0094555

(51) Int. Cl.
*B60H 1/32* (2006.01)
*B60H 1/00* (2006.01)

(52) U.S. Cl.
CPC ..... *B60H 1/32284* (2019.05); *B60H 1/00007* (2013.01)

(58) Field of Classification Search
CPC ........... B60H 1/00007; B60H 1/00278; B60H 1/00485; B60H 1/00885; B60H 1/00899; B60H 1/32284; B60H 2001/00307; B60H 2001/00928; B60H 2001/00949
See application file for complete search history.

(56) References Cited

U.S. PATENT DOCUMENTS

| | | | |
|---|---|---|---|
| 8,215,432 B2 | 7/2012 | Nemesh et al. | |
| 8,899,062 B2 | 12/2014 | Kadle et al. | |
| 9,109,840 B2 | 8/2015 | Kadle et al. | |
| 9,212,599 B2 * | 12/2015 | Gao | ........................ B60L 58/21 |
| 9,239,193 B2 | 1/2016 | Kadle et al. | |

(Continued)

FOREIGN PATENT DOCUMENTS

| | | |
|---|---|---|
| CN | 103380339 A | 10/2013 |
| JP | 5336033 B2 | 11/2013 |

(Continued)

*Primary Examiner* — Henry T Crenshaw
(74) *Attorney, Agent, or Firm* — SLATER MATSIL, LLP

(57) ABSTRACT

An embodiment heat pump system for a vehicle includes a first circuit including a radiator and a first valve in a first line, a second circuit including a first water pump, a second valve, and a third valve provided in a second line, a third circuit including electrical equipment provided in a third line, a fourth circuit including second water pump and a fourth valve provided in a fourth line, a fifth circuit including a battery module provided in a fifth line, a sixth circuit including a third water pump and a cooler provided in a sixth line, a seventh circuit including a fourth water pump and a heater provided in a seventh line, and a centralized energy module including a condenser, a chiller, and an evaporator.

20 Claims, 9 Drawing Sheets

(56) References Cited

U.S. PATENT DOCUMENTS

| | | | |
|---|---|---|---|
| 10,634,402 B2 | 4/2020 | Kim | |
| 10,688,847 B2 | 6/2020 | Kim | |
| 2012/0205088 A1* | 8/2012 | Morisita | B60L 1/02 |
| | | | 62/243 |
| 2012/0210746 A1 | 8/2012 | Kadle et al. | |
| 2012/0327596 A1* | 12/2012 | Anderson-Straley | ............... |
| | | | H01M 10/625 |
| | | | 361/689 |
| 2013/0283838 A1 | 10/2013 | Kadle et al. | |
| 2014/0041826 A1* | 2/2014 | Takeuchi | B60L 1/08 |
| | | | 165/10 |

FOREIGN PATENT DOCUMENTS

| | | |
|---|---|---|
| KR | 20190053487 A | 5/2019 |
| KR | 20190068126 A | 6/2019 |

\* cited by examiner

HEAT PUMP SYSTEM FOR VEHICLE

CROSS-REFERENCE TO RELATED APPLICATIONS

This application claims the benefit of Korean Patent Application No. 10-2022-0094555, filed on Jul. 29, 2022, which application is hereby incorporated herein by reference.

TECHNICAL FIELD

The present invention relates to a heat pump system for a vehicle.

BACKGROUND

In general, an air conditioning system for a vehicle includes an air conditioner that circulates a refrigerant in order to heat or cool the interior of the vehicle.

These air conditioners maintain a comfortable indoor environment by maintaining the interior temperature of the vehicle at an appropriate temperature regardless of a change of an external temperature, and are configured to heat or cool the interior of the vehicle by heat exchange between a condenser and an evaporator while a refrigerant discharged by an operation of a compressor circulates back to the compressor through the condenser, a receiver drier, an expansion valve, and the evaporator.

That is, in the air conditioner, in a cooling mode, the high-temperature and high-pressure gas phase refrigerant compressed from the compressor is condensed through the condenser, and then the temperature and humidity of the interior are lowered through evaporation in the evaporator through the receiver drier and expansion valve.

Meanwhile, as interest in energy efficiency and environmental pollution issues is growing day by day, the development of an eco-friendly vehicle that can substantially replace an internal combustion engine vehicle is required. The eco-friendly vehicle is generally classified into an electric vehicle driven by fuel cells or electricity as power sources, and a hybrid vehicle driven by using an engine and a battery.

Among these eco-friendly vehicles, a separate heater is not used in an electric vehicle or a hybrid vehicle unlike an air conditioner of a general vehicle, and an air conditioner applied to the eco-friendly vehicle is generally referred to as a heat pump system.

Meanwhile, in the case of the electric vehicle, a driving force is generated by converting the chemical reaction energy of oxygen and hydrogen into electrical energy. In this process, heat energy is generated by a chemical reaction within the fuel cell, and thus, effectively removing the generated heat is essential for securing the performance of the fuel cell.

In addition, the hybrid vehicle generates driving force by driving the motor using electricity supplied from the fuel cell or the electric battery together with the engine operated with general fuel, and thus, the performance of the motor can be secured only by effectively removing heat generated from the fuel cell, the battery, and the motor.

Accordingly, in a hybrid vehicle or an electric vehicle according to the prior art, a battery cooling system should be configured as a separate sealed circuit together with a cooling system and a heat pump system to prevent heat generation of a battery including a motor, electrical equipment, and a fuel cell.

Accordingly, the size and weight of a cooling module disposed in the front of the vehicle increases, and the layout of connection pipes for supplying refrigerant or coolant to the heat pump system, the cooling system, and the battery cooling system inside an engine room becomes complicated.

In addition, a battery cooling system that warms up or cools the battery according to the state of the vehicle is separately provided so that the battery exhibits the optimal performance. Therefore, a plurality of valves for connecting to each connection pipe are applied, and thus, there is also a disadvantage in that the noise and vibration caused by frequent opening and closing of these valves are transmitted to the vehicle interior, thereby reducing the riding comfort.

In addition, in order to recover waste heat from various heat sources in a heating mode of the vehicle, separate heat exchangers must be additionally provided, which increases the manufacturing cost.

The above information disclosed in this background section is only for enhancement of understanding of the background of embodiments of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle capable of cooling or heating an interior of a vehicle by selectively using a high-temperature coolant and a low-temperature coolant and efficiently recovering waste heat from various heat sources to improve heating performance.

Embodiments of the present invention have been made in an effort to provide a heat pump system for a vehicle having advantages of selectively heat-exchanging heat energy generated from a refrigerant during condensation and evaporation of the refrigerant with a coolant, and controlling an indoor temperature of the vehicle by using the heat-exchanged low-coolant or high-temperature coolant, respectively.

In addition, embodiments of the present invention have been made in an effort to provide a heat pump system for a vehicle having advantages of improving the heating efficiency of the vehicle by selectively using waste heat of electrical equipment and a battery module and an external heat source in a heating mode of the vehicle, and effectively controlling the temperature of the battery module so that optimal performance of the battery module is exhibited to increase the overall mileage of the vehicle.

An exemplary embodiment of the present invention provides a heat pump system for a vehicle including a first circuit which includes a radiator and a first valve provided in a first line and in which a coolant is circulated in the first line, a second circuit which includes a second line connected to the first valve, and a first water pump, a second valve, and a third valve provided in the second line, and in which coolant is circulated by operations of the first, second, and third valves and the first water pump, a third circuit which includes a third line connected to the second valve and electrical equipment provided in the third line and in which coolant is circulated by an operation of the second valve, a fourth circuit which includes a fourth line connected to the first valve separately from the second line, and a second water pump and a fourth valve provided in the fourth line and in which the coolant is circulated by operations of the first and fourth valves and the second water pump, a fifth circuit which includes a fifth line connected to the fourth valve and a battery module provided in the fifth line and in which the coolant is circulated by an operation of the fourth valve, a sixth circuit which includes a sixth line connected through the second valve and a third valve to cool a vehicle interior, and a third water pump and a cooler provided in the sixth line, a seventh circuit which includes a seventh line connected through the third valve and the fourth valve to heat the vehicle interior, and a fourth water pump and a heater provided in the seventh line, and a centralized energy module which includes a condenser provided in the second line to supply a low-temperature coolant to the cooler and a high-temperature coolant to the heater, a chiller provided in the fourth line, and an evaporator provided in the sixth line, and selectively heat exchanges heat energy generated during condensation and evaporation of a refrigerant circulating through an inside of the centralized energy module with the coolant circulating in the second line, the fourth line, and the sixth line.

The third circuit and the fifth circuit may be disposed in parallel through the second circuit and the fourth circuit based on the first circuit to form an independent circuit by the operations of the first valve, the second valve, and the fourth valve.

The first valve may include a first port through which the coolant cooled by the radiator is introduced, a second port through which the coolant is discharged to the radiator, a third port through which the coolant is introduced from the second line, a fourth port through which the coolant is discharged to the second line, a fifth port through which the coolant is introduced from the fourth line, and a sixth port through which the coolant is discharged to the fourth line.

The first water pump may be provided in the fourth port of the first valve, and the second water pump may be provided in the sixth port of the first valve.

The second valve may include a first port through which the coolant is introduced from the third valve through the second line, a second port which is connected to the second line connected to the condenser and through which the coolant is discharged to the condenser through the second line, a third port through which the coolant that has passed through the electrical equipment is introduced through the third line, a fourth port through which the coolant is discharged to the electrical equipment through the third line, a fifth port through which coolant is introduced through the sixth line, and a sixth port through which the coolant is discharged to the sixth line.

The sixth port of the second valve may be provided with the third water pump.

The third valve may include a first port through which the coolant is introduced from the first valve through the second line, a second port through which the coolant is discharged to the second valve through the second line, a third port through which the coolant is introduced from the second valve through the sixth line, a fourth port through which the coolant is discharged to the evaporator through the sixth line, a fifth port through which coolant that has passed through the heater is introduced through the seventh line, and a sixth port through which the coolant is discharged to the fourth valve through the seventh line.

The fourth valve may include a first port through which the coolant is introduced through the fourth line, a second port through which the coolant is discharged to the first valve through the fourth line, a third port through which the coolant is introduced from the third valve through the seventh line, a fourth port through which the coolant is discharged to the heater through the seventh line, a fifth port through which the coolant that has passed through the battery module is introduced through the fifth line, and a sixth port through which the coolant is discharged to the battery module through the fifth line.

The fourth port of the fourth valve may be provided with the fourth water pump.

The sixth circuit may include a branch line configured to selectively separate the sixth line and the cooler through a fifth valve provided in the sixth line between the evaporator and the cooler to selectively block the coolant that has passed through the evaporator from being introduced into the cooler.

The fifth valve may open the branch line and close a part of the sixth line connected to the cooler to prevent the coolant from being introduced into the cooler in a heating mode of the vehicle, and close the branch line and open a part of the sixth line connected to the cooler in a cooling mode or a heating and dehumidification mode of the vehicle.

When the electrical equipment and the battery module are cooled using the coolant, the first line connected to the first port of the first valve may be connected to the fourth line connected to the sixth port of the first valve, the fourth line connected to the first port of the fourth valve may be connected to the fifth line connected to the sixth port of the fourth valve, the fifth line passing through the battery module and connected to the fifth port of the fourth valve may be connected to the fourth line connected to the second port of the fourth valve, the fourth line connected to the second port of the fourth valve may be connected to the second line from the fifth port of the first valve through the fourth port of the first valve, the second line connected to the fourth port of the first valve may be connected to the first port of the second valve from the first port of the third valve through the second port of the third valve, the second line connected to the first port of the second valve may be connected to the third line connected to the fourth port of the second valve from the first port of the second valve, the third line passing through the electrical equipment and connected to the third port of the second valve may be connected to the second line through the second port of the second valve, the second line connected to the third port of the first valve may be connected to the first line connected to the second port of the first valve, the first water pump and the second water pump may be operated so that the coolant cooled by the radiator is circulated along the first line, the second line, the third line, the fourth line, and the fifth line, and the operations of the sixth circuit, the seventh circuit, and the centralized energy module may be stopped.

When the electric equipment and the battery module are cooled in a cooling mode of the vehicle, the first line connected to the first port of the first valve may be connected to the second line connected to the fourth port of the first valve, the second line connected to the fourth port of the first valve may be connected to the first port of the second valve through the first port of the third valve and the second port of the third valve, the second line connected to the first port of the second valve may be connected to the third line connected to the fourth port of the second valve from the first port of the second valve, the third line passing through the electrical equipment and connected to the third port of the second valve may be connected to the second line through the second port of the second valve, the second line passing through the condenser and connected to the third port of the first valve may be connected to the first line connected to the second port of the first valve, the first water pump may be operated so that the coolant cooled by the radiator circulates along the first line, the second line, and the third line, in the fourth circuit, the fourth line connected to the sixth port of the first valve may pass through the chiller, and then be connected to the fifth line connected to the sixth port of the fourth valve from the first port of the fourth valve, the fifth line passing through the battery module and connected to the fifth port of the fourth valve may be connected to the fourth line connected to the second port of the fourth valve from the fifth port of the fourth valve, the fourth line connected to the second port of the fourth valve may be connected to the chiller through the fifth port of the first valve and the sixth port of the first valve, the second water pump may be operated so that the coolant is independently circulated from the fourth circuit along the fifth circuit, in the sixth circuit, the sixth line may form an independent closed circuit through the fifth port and the sixth port of the second valve and the third port and the fourth port of the third valve so that the coolant circulates independently along the sixth line through the operation of the third water pump, and the operation of the seventh circuit may be stopped, and the refrigerant may be circulated in the centralized energy module.

When an external heat source and waste heat of the electrical equipment are recovered in a heating mode of the vehicle, the first line connected to the first port of the first valve may be connected to the fourth line connected to the sixth port of the first valve, the fourth line passing through the chiller and connected to the first port of the fourth valve may be connected from the second port of the fourth valve to the fifth port of the first valve, the fourth line connected to the fifth port of the first valve may be connected to the first line connected to the second port of the first valve from the fifth port of the first valve, the first circuit and the fourth circuit may be connected, and the second water pump may be operated so that the coolant that has passed through the radiator circulates along the first line and the fourth line, the second line connected to the fourth port of the first valve may be connected to the seventh line connected to the sixth port of the third valve from the first port of the third valve, the seventh line connected to the sixth port of the third valve may pass through the heater from the third port of the fourth valve through the fourth port of the fourth valve, and then be connected to the fifth port of the third valve, the seventh line connected to the fifth port of the third valve may be connected to the second line connected to the second port of the third valve, the second line connected to the second port of the third valve may pass through the condenser from the first port of the second valve through the second port of the second valve, and then be connected to the third port of the first valve, the second circuit may be connected to the seventh circuit, and the first water pump and the fourth water pump may each be operated so that the coolant is circulated along the second line and the seventh line, the third line connected to the third port of the second valve may be connected to the sixth line connected to the sixth port of the second valve, the sixth line connected to the sixth port of the second valve may pass through the evaporator from the third port of the third valve through the fourth port of the third valve, and then be connected to the branch line opened by the operation of the fifth valve, a part of the sixth line connected to the branch line may be connected to the third line from the fifth port of the second valve through the fourth port of the second valve without passing through the cooler, the third line connected to the fourth port of the second valve may pass through the electrical equipment and be connected to the third port of the second valve, the third circuit may be connected to the fifth circuit, and the third water pump may be operated so that the coolant is circulated along the third line and the sixth line, and the operation of the fifth circuit may be stopped, and refrigerant may be circulated in the centralized energy module.

When waste heat of the electrical equipment and the battery module is recovered in a heating mode of the vehicle, the operation of the first circuit may be stopped, in the fourth circuit, the fourth line connected to the sixth port of the first valve may pass through the chiller, and then be connected to the fifth line connected to the sixth port of the fourth valve from the first port of the fourth valve, the fifth line passing through the battery module and connected to the fifth port of the fourth valve may be connected to the fourth line connected to the second port of the fourth valve from the fifth port of the fourth valve, the fourth line connected to the second port of the fourth valve may be connected to the chiller through the fifth port of the first valve and the sixth port of the first valve, the second water pump may be operated so that the coolant is independently circulated from the fourth circuit along the fifth circuit, the second line connected to the fourth port of the first valve may be connected to the seventh line connected to the sixth port of the third valve from the first port of the third valve, the seventh line connected to the sixth port of the third valve may pass through the heater from the third port of the fourth valve through the fourth port of the fourth valve, and then be connected to the fifth port of the third valve, the seventh line connected to the fifth port of the third valve may be connected to the second line connected to the second port of the third valve, the second line connected to the second port of the third valve may pass through the condenser from the first port of the second valve through the second port of the second valve, and then be connected to the third port of the first valve, the second circuit may be connected to the seventh circuit, and the first water pump and the fourth water pump may each be operated so that the coolant is circulated along the second line and the seventh line, the third line connected to the third port of the second valve may be connected to the sixth line connected to the sixth port of the second valve, the sixth line connected to the sixth port of the second valve may pass through the evaporator from the third port of the third valve through the fourth port of the third valve, and then be connected to the branch line opened by the operation of the fifth valve, a part of the sixth line connected to the branch line may be connected to the third line from the fifth port of the second valve through the fourth port of the second valve without passing through the cooler, the third line connected to the fourth port of the second valve may pass through the electrical equipment and be connected to the third port of the second valve, the third circuit may be connected to the fifth circuit, and the third water pump may be operated so that the coolant is circulated along the third line and the sixth line, and the refrigerant may be circulated in the centralized energy module.

When an external heat source is recovered in a heating and dehumidification mode of the vehicle, the first line connected to the first port of the first valve may be connected to the fourth line connected to the sixth port of the first valve, the fourth line passing through the chiller and connected to the first port of the fourth valve may be connected from the second port of the fourth valve to the fifth port of the first valve, the fourth line connected to the fifth port of the first valve may be connected to the first line connected to the second port of the first valve from the fifth port of the first valve, the first circuit and the fourth circuit may be connected, and the second water pump may be operated so that the coolant that has passed through the radiator circulates along the first line and the fourth line, the second line connected to the fourth port of the first valve may be connected to the seventh line connected to the sixth port of the third valve from the first port of the third valve, the seventh line connected to the sixth port of the third valve may pass through the heater from the third port of the fourth valve through the fourth port of the fourth valve, and then be connected to the fifth port of the third valve, the seventh line connected to the fifth port of the third valve may be connected to the second line connected to the second port of the third valve, the second line connected to the second port of the third valve may pass through the condenser from the first port of the second valve through the second port of the second valve, and then be connected to the third port of the first valve, the second circuit may be connected to the seventh circuit, and the first water pump and the fourth water pump are each operated so that the coolant is circulated along the second line and the seventh line, in the sixth circuit, the sixth line may form an independent closed circuit by the sixth port of the second valve, the third port of the third valve, the fourth port of the third valve, and the fifth port of the second valve, the third water pump may be operated so that the coolant sequentially passes through the evaporator and the cooler along the sixth line, and the refrigerant may be circulated in the centralized energy module.

When an external heat source and waste heat of the electrical equipment are recovered to heat the battery module in a heating mode of the vehicle, the first line connected to the first port of the first valve may be connected to the fourth line connected to the sixth port of the first valve, the fourth line passing through the chiller and connected to the first port of the fourth valve may be connected from the second port of the fourth valve to the fifth port of the first valve, the fourth line connected to the fifth port of the first valve may be connected to the first line connected to the second port of the first valve from the fifth port of the first valve, the first circuit and the fourth circuit may be connected, and the second water pump may be operated so that the coolant that has passed through the radiator circulates along the first line and the fourth line, the second line connected to the fourth port of the first valve may be connected to the seventh line connected to the sixth port of the third valve from the first port of the third valve, the seventh line connected to the sixth port of the third valve may be connected to the fifth line from the third port of the fourth valve through the sixth port of the fourth valve, the fifth line passing through the battery module and connected to the fifth port of the fourth valve may be connected from the fifth port of the fourth valve to the seventh line connected to the fourth port of the fourth valve, the seventh line connected to the fourth port of the fourth valve may pass through the heater, and then be connected to the fifth port of the third valve, the seventh line connected to the fifth port of the third valve may be connected to the second line connected to the second port of the third valve, the second line connected to the second port of the third valve may pass through the condenser from the first port of the second valve through the second port of the second valve, and then be connected to the third port of the first valve, the second circuit may be connected to the fifth circuit and the seventh circuit, and the first water pump and the fourth water pump may each be operated so that the coolant is circulated along the second line, the fifth line, and the seventh line, the third line connected to the third port of the second valve may be connected to the sixth line connected to the sixth port of the second valve, the sixth line connected to the sixth port of the second valve may pass through the evaporator from the third port of the third valve through the fourth port of the third valve, and then be connected to the branch line opened by the operation of the fifth valve, a part of the sixth line connected to the branch line may be connected to the third line from the fifth port of the second valve through the fourth port of the second valve without passing through the cooler, the third line connected to the fourth port of the second valve may pass through the electrical equipment and be connected to the third port of the second valve, the third circuit may be connected to the fifth circuit, and the third water pump may be operated so that the coolant is circulated along the third line and the sixth line, and the refrigerant may be circulated in the centralized energy module.

When a heating mode of the vehicle is performed with waste heat of the electrical equipment, the first circuit, the fourth circuit, the fifth circuit, and the sixth circuit may be stopped, the second line connected to the fourth port of the first valve may be connected to the seventh line connected to the sixth port of the third valve from the first port of the third valve, the seventh line connected to the sixth port of the third valve may pass through the heater from the third port of the fourth valve through the fourth port of the fourth valve, and then be connected to the fifth port of the third valve, the seventh line connected to the fifth port of the third valve may be connected to the second line connected to the second port of the third valve, the second line connected to the second port of the third valve may be connected to the first port of the second valve, the second line connected to the first port of the second valve may be connected to the third line connected to the fourth port of the second valve from the first port of the second valve, the third line passing through the electrical equipment and connected to the third port of the second valve may be connected to the second line through the second port of the second valve, the second line passing through the condenser and connected to the third port of the first valve may be connected to the second line connected to the first port of the third valve from the third port of the first valve through the fourth port of the first valve, the second circuit may be connected to the seventh circuit and the third circuit, and the first water pump and the fourth water pump may each be operated so that the coolant is circulated along the second line, the seventh line, and the third line, and the operation of the centralized energy module may be stopped.

When the electrical equipment and the battery module are heated, the first circuit, the sixth circuit, and the seventh circuit may be stopped, the second line connected to the fourth port of the first valve may be connected to the first port of the second valve from the first port of the third valve through the second port of the third valve, the second line connected to the first port of the second valve may be connected to the third line connected to the fourth port of the second valve from the first port of the second valve, the third line passing through the electrical equipment and connected to the third port of the second valve may be connected to the second line through the second port of the second valve, the second line connected to the second port of the second valve may be connected from the third port of the first valve to the fourth line connected to the sixth port of the first valve, the fourth line may be connected from the first port of the fourth valve to the fifth line connected to the sixth port of the fourth valve, the fifth line passing through the battery module and connected to the fifth port of the fourth valve may be connected to the fourth line connected to the second port of the fourth valve from the fifth port of the fourth valve, the fourth line connected to the second port of the fourth valve may be connected to the second line from the fifth port of the first valve through the fourth port of the first valve, the second circuit may be connected to the third circuit, the fourth circuit, and the fifth circuit, and the first water pump and the second water pump may each be operated such that the coolant is circulated along the second line, the third line, the fourth line, and the fifth line, and the operation of the centralized energy module may be stopped.

The centralized energy module may include a compressor connected to a refrigerant line and compressing refrigerant, the condenser connected to the compressor through the refrigerant line and condensing the refrigerant by performing heat exchange between the coolant circulating in the second line and the refrigerant, a first expansion valve connected to the condenser through the refrigerant line and expanding the refrigerant, the evaporator connected to the first expansion valve through the refrigerant line, and evaporating the refrigerant by performing heat exchange between the coolant circulating in the sixth line and the refrigerant, an accumulator provided in the refrigerant line between the evaporator and the compressor, a refrigerant connection line having one end connected to the refrigerant line connected to the condenser so that the refrigerant discharged from the condenser is selectively introduced, and the other end connected to the accumulator to introduce the refrigerant into the compressor together with the refrigerant discharged from the evaporator, a second expansion valve provided in the refrigerant connection line to selectively introduce the refrigerant discharged from the condenser into the refrigerant connection line and to selectively expand the refrigerant introduced into the refrigerant connection line, and the chiller provided in the refrigerant connection line so that the refrigerant that has passed through the second expansion valve is introduced into the chiller, and performing heat exchange between the coolant circulating in the fourth line and the refrigerant.

According to an embodiment of the present invention, the first valve can be integrally mounted to a reservoir tank.

Moreover, it is possible to selectively heat-exchange heat energy generated from the refrigerant during condensation and evaporation of the refrigerant with the coolant and control an indoor temperature of the vehicle by using the heat-exchanged low-coolant or high-temperature coolant, respectively. Therefore, the system can be simplified and a layout of connection pipes through which the refrigerant circulates can be simplified.

In addition, by arranging the electrical equipment and the battery module in parallel through each line so that the coolant circulates independently of the electrical equipment and the battery module, independent cooling of the electrical equipment and the battery module is possible, and waste heat of the electrical equipment and the battery module can be simultaneously recovered in the heating mode of the vehicle, or only the waste heat of any one can be selectively recovered. Therefore, it is possible to improve the overall marketability of the vehicle.

In addition, it is possible to improve heating efficiency of the vehicle by selectively using waste heat of the electrical equipment and the battery module and an external heat source in the heating mode of the vehicle and effectively control the temperature of the battery module so that optimal performance of the battery module is exhibited to increase the overall mileage of the vehicle.

In addition, by packaging a centralized energy module (CE module) that generates heat energy through condensation and evaporation of the refrigerant, and by using high-performance refrigerant, the size and weight can be reduced, and it is possible to prevent the occurrence of noise, vibration, and operation instability compared to the conventional air conditioner.

Furthermore, it is possible to reduce the manufacturing cost and reduce the weight through the simplification of the entire system, and it is possible to improve space utilization by minimizing the components.

Figure 1:
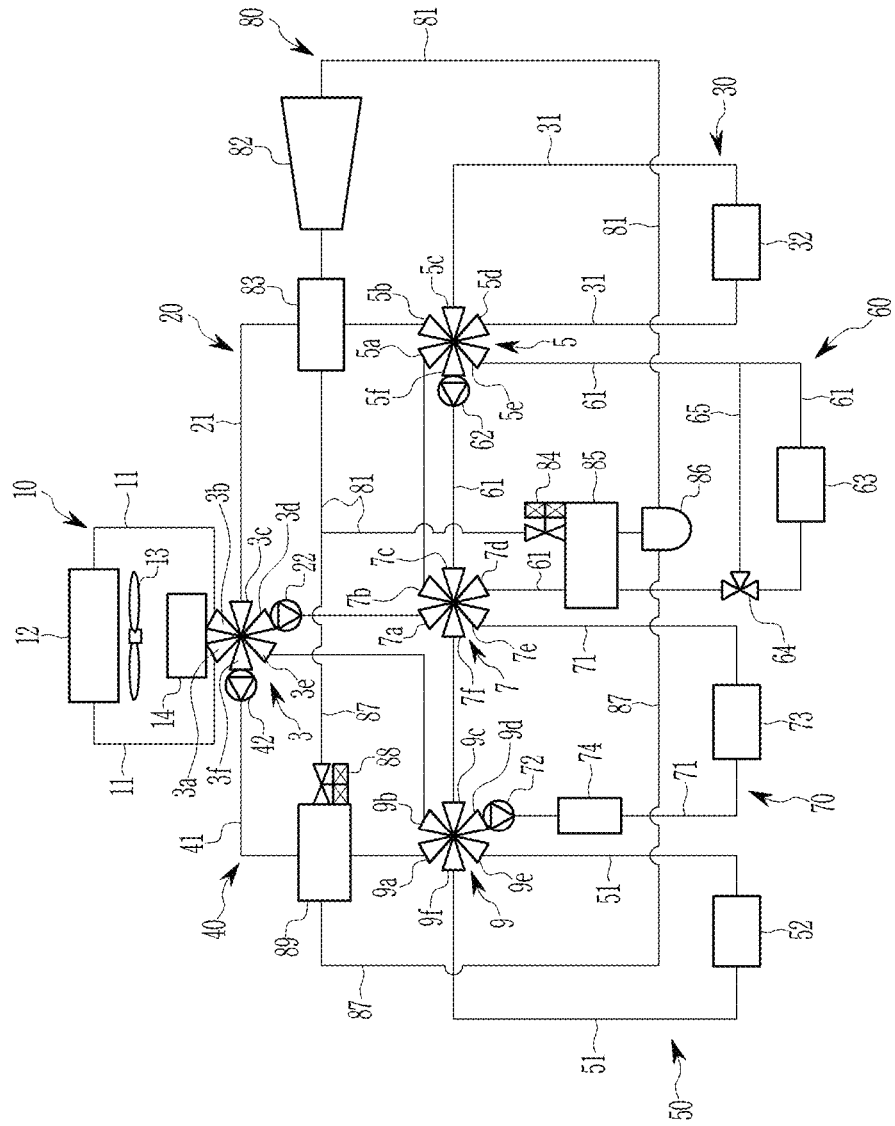
FIG. 1 is a block diagram of a heat pump system for a vehicle according to one embodiment of the present invention.

The following reference identifiers may be used in connection with the accompanying drawings to describe exemplary embodiments of the present disclosure.

| | |
|---|---|
| 3, 5, 7, 9: First, second, third, and fourth valves | 11: First line |
| | 13: Cooling fan |
| 10: First circuit | 20: Second circuit |
| 12: Radiator | 22: First water pump |
| 14: Reservoir tank | 31: Third line |
| 21: Second line | 40: Fourth circuit |
| 30: Third circuit | 42: Second water pump |
| 32: Electrical component | 51: Fifth line |
| 41: Fourth line | 60: Sixth circuit |
| 50: Fifth circuit | 62: Third water pump |
| 52: Battery module | 64: Fifth valve |
| 61: Sixth line | 70: Seventh circuit |
| 63: Cooler | 72: Fourth water pump |
| 65: Branch line | 74: Coolant heater |
| 71: Seventh line | 81: Refrigerant line |
| 73: Heater | 83: Condenser |

-continued

| | |
|---|---|
| 80: CE module | 85: Evaporator |
| 82: Compressor | 87: Refrigerant |
| 84: First expansion valve | connection line |
| 86: Accumulator | |
| 88: Second expansion valve | |

DETAILED DESCRIPTION OF ILLUSTRATIVE EMBODIMENTS

Exemplary embodiments of the present invention will hereinafter be described in detail with reference to the accompanying drawings.

Prior to this, configurations shown in the embodiments and drawings described in the present specification are only the most preferred embodiments of the present invention and do not represent all of the technical spirit of the present invention, and thus, it should be understood that various equivalents and modifications may be substituted for them at the time of filing the present application.

In order to clearly describe embodiments of the present invention, parts irrelevant to the description are omitted, and the same reference numerals are assigned to the same or similar elements throughout the specification.

Since the size and thickness of each component shown in the drawings are arbitrarily indicated for convenience of description, embodiments of the present invention are not necessarily limited to that shown in the drawings, and the thickness is enlarged in order to clearly express various parts and regions.

Moreover, throughout the specification, when a part "includes" a certain component, this means that other components may be further included, rather than excluding other components, unless otherwise stated.

In addition, terms such as " . . . unit", " . . . means", " . . . portion", and " . . . member" described in the specification refer to a unit of a comprehensive configuration that performs at least one function or operation.

FIG. 1 is a block diagram of a heat pump system for a vehicle according to one embodiment of the present invention.

The heat pump system for a vehicle according to one embodiment of the present invention selectively heat-exchanges heat energy generated from a refrigerant during condensation and evaporation of the refrigerant with a coolant to perform a cooling or heating mode of the vehicle using only low-temperature or high-temperature coolant.

In addition, the heat pump system selectively uses waste heat of an electrical equipment 32 and a battery module 52 and an external heat source in the heating mode of the vehicle to improve the heating efficiency of the vehicle, and can effectively adjust the temperature of the battery module 52 so that optimal performance of the battery module 52 is exhibited.

Such a heat pump system is applied to a hybrid vehicle or an electric vehicle. Referring to FIG. 1, the heat pump system includes a first circuit 10, a second circuit 20, a third circuit 30, a fourth circuit 40, a fifth circuit 50, a sixth circuit 60, a seventh circuit 70, and a centralized energy module 80 (hereinafter, referred to as a CE module).

First, the first circuit 10 includes a first line 11 through which the coolant is circulated, and a first valve 3 and a radiator 12 provided in the first line 11.

The radiator 12 is disposed at the front of the vehicle, and a cooling fan 13 is provided at the rear of the radiator 12.

Accordingly, the radiator 12 cools the coolant through the operation of the cooling fan 13 and heat exchange with the outside air.

In the first circuit 10 configured in this way, the coolant cooled by the radiator 12 may circulate along the first line 11.

In the present embodiment, the second circuit 20 includes a second line 21 connected to the first valve 3, and a second valve 5, a third valve 7, and a first water pump 22 provided in the second line 21.

In this second circuit 20, the coolant may be circulated along the second line 21 by operations of the first, second, and third valves 3, 5, 7 and the first water pump 22.

The third circuit 30 includes a third line 31 connected to the second valve 5 and electrical equipment 32 provided in the third line 31.

Here, the electrical equipment 32 may include an electric power control unit (EPCU) including a motor and an on-board charger (OBC).

The electric power control device may generate heat while driving, and the on-board charger may generate heat when charging the battery module 52.

That is, when the waste heat of the electrical equipment 32 is recovered in the heating mode of the vehicle, the heat generated from the electric power control device is recovered, and the heat generated from the on-board charger can be recovered when the battery module 52 is charged.

In the third circuit 30 configured in this way, the coolant may be circulated along the third line 31 by the selective operation of the second valve 5.

In the present embodiment, the fourth circuit 40 may include a fourth line 41 connected to the first valve 3 separately from the second line 21, and a fourth valve 9 and a second water pump 42 provided in the fourth line 41.

In this fourth circuit 40, the coolant may be circulated by the selective operation of the first and fourth valves 3 and 9 and the second water pump.

The fifth circuit 50 may include a fifth line 51 connected to the fourth valve 9 and the battery module 52 provided in the fifth line 51.

In this fifth circuit 50, the coolant may be circulated along the fifth line 51 by the selective operation of the fourth valve 9. Here, the battery module 52 supplies power to the electrical equipment 32 and is formed in a water-cooling type module cooled by the coolant flowing along the fifth line 51.

In addition, the battery module 52 is selectively connected to the first and second circuits 10 and 20 through the fifth line 51 according to the operations of the first and fourth valves 3 and 9 and may be cooled by the coolant circulating in the fifth line 51.

Here, the third circuit 30 and the fifth circuit 50 may be disposed in parallel through the second circuit 20 and the fourth circuit 40 based on the first circuit 10 to form an independent circuit by the operations of the first valve 3, the second valve 5, and the fourth valve 9.

In the present embodiment, the sixth circuit 60 may include a sixth line 61 connected through the second valve 5 and the third valve 7 to cool the vehicle interior, and a third water pump 62 and a cooler 63 provided in the sixth line 61.

In the sixth circuit 60 configured as described above, the coolant may be circulated in the sixth line 61 through the operations of the second and third valves 5 and 7 and the third water pump 62, and the low-temperature coolant cooled by the CE module 80 may be supplied to the cooler 63.

Here, the cooler 63 is provided inside an HVAC module (not shown) provided in the vehicle. Accordingly, the air supplied from the HVAC module to the interior of the vehicle may be cooled and introduced through heat exchange with low-temperature coolant while passing through the cooler 63.

In addition, the sixth circuit 60 may include a branch line 65 which selectively separates the sixth line 61 and the cooler 63 through the fifth valve 64 provided in the sixth line 61 between an evaporator 85 and the cooler 63 to selectively block the coolant that has passed through the evaporator 85 of the CE module 80 from being introduced into the cooler 63.

The fifth valve 64 may open the branch line 65 and close a part of the sixth line 61 connected to the cooler 63 to prevent the coolant from being introduced into the cooler 63 in the heating mode of the vehicle.

Meanwhile, the fifth valve 64 may close the branch line 65 and open a part of the sixth line 61 connected to the cooler 63 so that the coolant is introduced into the cooler 63 in the cooling mode or the heating and dehumidification mode of the vehicle.

In the present embodiment, the seventh circuit 70 may include a seventh line 71 connected through the third valve 7 and the fourth valve 9 to heat the vehicle interior, and a fourth water pump 72 and a heater 73 provided in the seventh line 71.

In the seventh circuit 70 configured in this way, the coolant is circulated in the seventh line 71 through the selective operation of the third and fourth valves 7 and 9 and the fourth water pump 72. Accordingly, the seventh circuit 70 may supply the high-temperature coolant heated by the CE module 80 to the heater 73.

In the present embodiment, the heater 73 is provided inside the HVAC module (not shown) provided in the vehicle. Accordingly, the air supplied from the HVAC module to the interior of the vehicle may be heated and introduced through heat exchange with the high-temperature coolant while passing through the heater 73.

Here, a coolant heater 74 for selectively heating the coolant circulating in the seventh line 71 may be provided in the seventh line 71 between the fourth water pump 72 and the heater 73.

The coolant heater 74 is turned on when the temperature of the coolant supplied to the heater 73 along the seventh line 71 in the heating mode or the heating and dehumidification mode of the vehicle is lower than a target temperature to heat the coolant circulated in the seventh line 71, and thus, the coolant of which a temperature has risen can be introduced into the heater 73.

The coolant heater 74 may be operated when the battery module 24 is heated.

The coolant heater 74 may be an electric heater that operates according to a power supply.

Meanwhile, in the present embodiment, the coolant heater 74 is provided in the seventh line 71 as an example, but embodiments of the present invention are not limited thereto. An air heater may be applied to the inside of the HVAC module (not shown) in order to increase the temperature of the outside air introduced into the interior of the vehicle instead of the coolant heater 74.

The air heater may be disposed at the rear of the heater 73 from the inside of the HVAC module (Heating, Ventilation, and Air Conditioning) toward the interior of the vehicle so as to selectively heat the outside air that has passed through the heater 73.

That is, any one of the coolant heater 74 and the air heater may be applied to the seventh circuit 70.

In the seventh circuit 70 configured in this way, the high-temperature coolant introduced into the seventh line 71 in the heating mode, or the heating and dehumidification mode of the vehicle, or the coolant whose temperature has increased while circulating the seventh line 71 may be supplied to the heater 73 by the operation of the fourth water pump 72, and thus, it is possible to heat the vehicle interior.

Here, the cooler 63 and the heater 73 may be configured as a water-cooling type that is cooled or heated according to the temperature of the coolant introduced therein.

In addition, the first, second, third, and fourth water pumps 22, 42, 62, and 72 may be electric water pumps.

Meanwhile, in the present embodiment, the first, second, third, and fourth valves 3, 5, 7, and 9 may be 6-way valves. The first, second, third and fourth valves 3, 5, 7, and 9 will be described in more detail below.

First, the first valve 3 may include a first port 3a through which the coolant cooled by the radiator 12 is introduced, a second port 3b through which the coolant is discharged to the radiator 12, a third port 3c through which the coolant is introduced from the second line 21, a fourth port 3d through which the coolant is discharged to the second line 21, a fifth port 3e through which the coolant is introduced from the fourth line 41, and a sixth port 3f through which the coolant is discharged to the fourth line 41.

Here, the first water pump 22 may be provided in the fourth port 3d of the first valve 3, and the second water pump 42 may be provided in the sixth port 3f of the first valve 3.

Moreover, the first valve 3 may be integrally mounted to a reservoir tank 14. The coolant that has been cooled by the radiator 12 may be stored in the reservoir tank 14.

That is, the first port 3a and the second port 3b of the first valve 3 may be integrally connected to the reservoir tank 14 in a state in which they are respectively connected to the first line 11.

In the present embodiment, the second valve 5 may include a first port 5a through which the coolant is introduced from the third valve 5 through the second line 21, a second port 5b which is connected to the second line 21 connected to a condenser 83 of the CE module 8o and through which the coolant is discharged to the condenser 83 through the second line 21, a third port 5c through which the coolant that has passed through the electrical equipment 32 is introduced through the third line 31, a fourth port 5d through which the coolant is discharged to the electrical equipment 32 through the third line 31, a fifth port 5e through which coolant is introduced through the sixth line 61, and a sixth port 5f through which the coolant is discharged to the sixth line 61.

Here, the third water pump 62 may be provided in the sixth port 6f of the second valve 5.

In the present embodiment, the third valve 7 may include a first port 7a through which the coolant is introduced from the first valve 3 through the second line 21, a second port 7b through which the coolant is discharged to the second valve 5 through the second line 21, a third port 7c through which the coolant is introduced from the second valve 5 through the sixth line 61, a fourth port 7d through which the coolant is discharged to the evaporator 85 through the sixth line 61, a fifth port 7e through which coolant that has passed through the heater 73 is introduced through the seventh line 71, and a sixth port 7f through which the coolant is discharged to the fourth valve 9 through the seventh line 17.

Moreover, the fourth valve 9 may include a first port 9a through which the coolant is introduced through the fourth line 41, a second port 9b through which the coolant is discharged to the first valve 3 through the fourth line 41, a third port 9c through which the coolant is introduced from the third valve 7 through the seventh line 71, a fourth port 9d through which the coolant is discharged to the heater 73 through the seventh line 17, a fifth port 9e through which the coolant that has passed through the battery module 52 is introduced through the fifth line 51, and a sixth port 9f through which the coolant is discharged to the battery module 52 through the fifth line 51.

Here, the fourth water pump 72 may be provided at the fourth port 9d of the fourth valve 9.

Moreover, the CE module 80 may include a condenser 83 provided in the second line 21 to supply a low-temperature coolant to the cooler 63 and a high-temperature coolant to the heater 73, a chiller 89 provided in the fourth line 41, and an evaporator 85 provided in the sixth line 61.

The CE module 80 may selectively heat-exchange heat energy generated during condensation and evaporation of refrigerant circulating through the inside of the CE module 80 with coolant, and may each supply the heat-exchanged low-temperature or high-temperature coolant to the sixth circuit 60 and the seventh circuit 70.

The refrigerant may be a high-performance R152-a or R744 refrigerant.

That is, the low-temperature coolant is supplied to the cooler 63 through the sixth line 61, and the high-temperature coolant is supplied to the heater 73 through the seventh line 71.

Here, the CE module 80 includes a compressor 82, the condenser 83, a first expansion valve 84, the evaporator 85, an accumulator 86, a refrigerant connection line 87, a second expansion valve 88, and the chiller 89.

First, the compressor 82 may be connected to the refrigerant line 81 through which the refrigerant circulates, and may compress the refrigerant.

The condenser 83 is provided in the second line 21, and is connected to the compressor 82 through the refrigerant line 81. The condenser 83 may condense the refrigerant by performing heat exchange between the refrigerant and the coolant circulating in the second line 21.

That is, the condenser 83 condenses the introduced refrigerant by performing heat exchange between the refrigerant and the coolant, and increases the temperature of the coolant by supplying heat energy generated when the refrigerant is condensed to the coolant. Here, the condenser 83 may be a water-cooled heat exchanger into which coolant is introduced.

The first expansion valve 84 is connected to the condenser 83 through the refrigerant line 81. The first expansion valve 84 receives the refrigerant that has passed through the condenser 83 and expands the refrigerant. The first expansion valve 84 may be an electronic expansion valve that selectively expands the refrigerant while controlling the flow of the refrigerant.

The evaporator 85 is provided in the sixth line 61, and may be connected to the first expansion valve 84 through the refrigerant line 81. The evaporator 85 may perform heat exchange between the refrigerant and the coolant circulating in the sixth line 61 to evaporate the refrigerant.

That is, the evaporator 85 performs heat exchange between the introduced refrigerant and the coolant to evaporate the refrigerant, and supplies low-temperature heat energy generated when the refrigerant evaporates to the coolant to lower the temperature of the coolant. Here, the evaporator 85 may be a water-cooled heat exchanger into which coolant is introduced.

The accumulator 86 is provided in the refrigerant line 81 between the evaporator 85 and the compressor 82. The accumulator 86 supplies only gaseous refrigerant to the compressor 82, thereby improving the efficiency and durability of the compressor 82.

In the present embodiment, one end of the refrigerant connection line 87 may be connected to the refrigerant line 81 connected to the condenser 83 so that the refrigerant discharged from the condenser 83 is selectively introduced.

Moreover, the other end of the refrigerant connection line 87 may be connected to the accumulator 86 to introduce the refrigerant into the compressor 82 together with the refrigerant discharged from the evaporator 85.

The second expansion valve 88 may be provided in the refrigerant connection line 87 to selectively introduce the refrigerant discharged from the condenser 83 into the refrigerant connection line 87 connected to the refrigerant line 81 and to selectively expand the refrigerant introduced in the refrigerant connection line 87.

This second expansion valve 88 may be an electronic expansion valve that selectively expands the refrigerant while controlling the flow of refrigerant.

In addition, the chiller 89 may be connected to the fourth line 41 so that coolant passes through the chiller 89, and may be provided in the refrigerant connection line 87 so that the refrigerant that has passed through the second expansion valve 88 is introduced. The chiller 89 may perform heat exchange between the coolant circulating in the fourth line 41 and the refrigerant.

That is, the chiller 89 can control the temperature of the coolant by performing heat exchange between the coolant selectively introduced into the inside through the fourth line 41 and the refrigerant supplied through the refrigerant connection line 87. Here, the chiller 89 may be a water-cooled heat exchanger into which the coolant is introduced.

That is, the condenser 83, the evaporator 85, and the chiller 89 may be water-cooled heat exchangers which are connected to each other through the refrigerant line 81 through which the refrigerant circulates and the refrigerant connection line 87, and perform heat exchange between the coolant and the refrigerant.

Hereinafter, operation and action for each mode of the heat pump system for a vehicle according to one embodiment of the present invention configured as described above will be described in detail with reference to FIGS. 2 to 9.

First, an operation for cooling the electrical equipment 32 and the battery module 52 using the coolant cooled by the radiator 12 in the heat pump system for a vehicle according to one embodiment of the present invention will be described with reference to FIG. 2.

Figure 2:
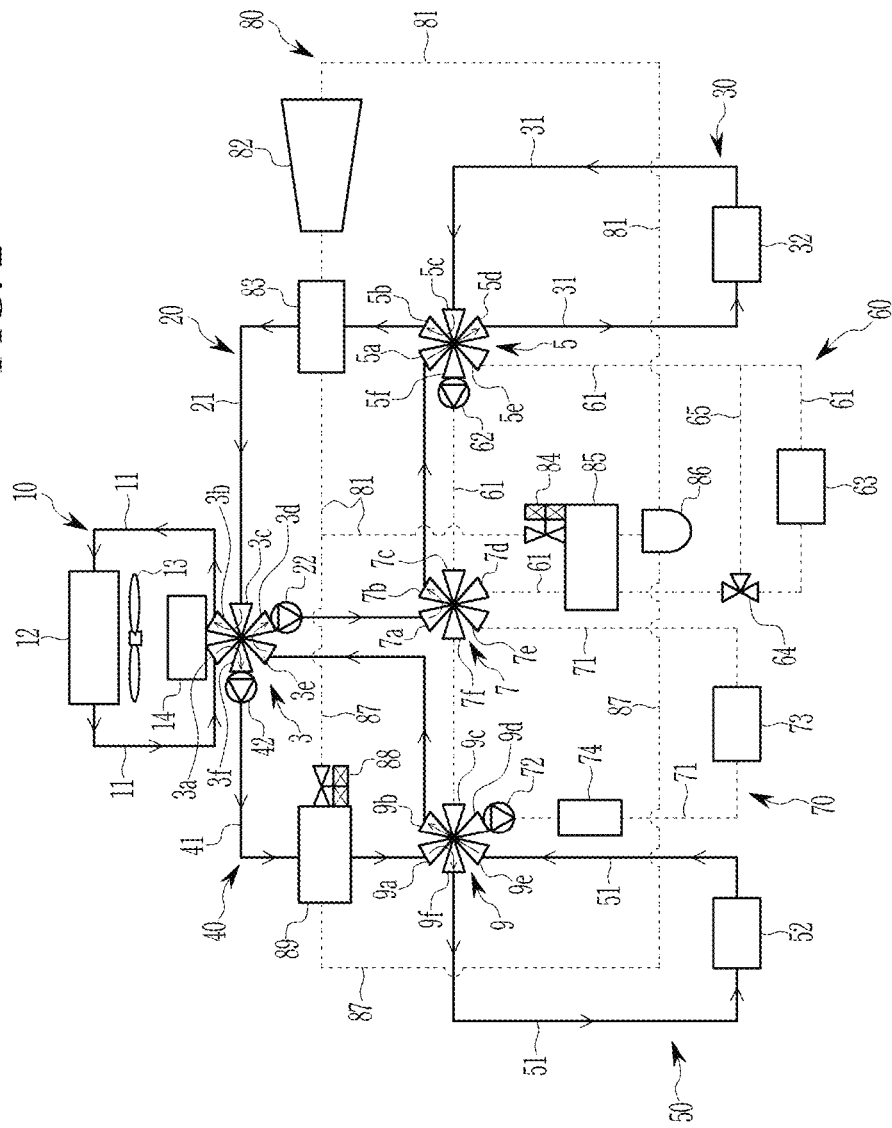
FIG. 2 is an operation state diagram for cooling electrical equipment and a battery module using a coolant cooled by a radiator in the heat pump system for a vehicle according to one embodiment of the present invention.

FIG. 2 is an operation state diagram for cooling the electrical equipment and the battery module using the coolant cooled by the radiator in the heat pump system for a vehicle according to one embodiment of the present invention.

Referring to FIG. 2, the first line 11 connected to the first port 3a of the first valve 3 is connected to the fourth line 41 connected to the sixth port 3f of the first valve 3.

The fourth line 41 connected to the first port 9a of the fourth valve 9 is connected to the fifth line 51 connected to the sixth port 9f of the fourth valve 9.

The fifth line 51 passing through the battery module 52 and connected to the fifth port 9e of the fourth valve 9 is connected to the fourth line 41 connected to the second port 9b of the fourth valve 9.

The fourth line 41 connected to the second port 9b of the fourth valve 9 is connected from the fifth port 3e of the first valve 3 to the second line 21 through the fourth port 3d of the first valve 3.

The second line 21 connected to the fourth port 3d of the first valve 3 is connected from the first port 7a of the third valve 7 to the first port 5a of the second valve 5 through the second port 7b of the third valve 7.

The second line 21 connected to the first port 5a of the second valve 5 is connected from the first port 5a of the second valve 5 to the third line 31 connected to the fourth port 5d of the second valve 5.

The third line 31 passing through the electrical equipment 32 and connected to the third port 5c of the second valve 5 is connected to the second line 21 through the second port 5b of the second valve 5.

The second line 21 connected to the third port 3c of the first valve 3 is connected to the first line 11 connected to the second port 3b of the first valve 3.

In this state, the first water pump 22 and the second water pump 42 may be operated so that the coolant cooled by the radiator 12 is circulated along the first line 11, the second line 21, the third line 31, the fourth line 41, and the fifth line 51.

Accordingly, the coolant cooled by the radiator 12 is introduced into the first port 3a of the first valve 3 through the first line 11, and then discharged to the sixth port 3f of the first valve 3.

The coolant discharged to the sixth port 3f of the first valve 3 is introduced into the first port 9a of the fourth valve 9 along the fourth line 41, and then discharged to the sixth port 9f of the fourth valve 9.

The coolant discharged to the sixth port 9f of the fourth valve 9 may pass through the battery module 52 along the fifth line 51, and then be introduced into the fifth port 9e of the fourth valve 9.

Here, the battery module 52 may be efficiently cooled by coolant flowing from the radiator 12 along the first line 11, the fourth line 41, and the fifth line 51.

Thereafter, the coolant introduced into the fifth port 9e of the fourth valve 9 is introduced into the fifth port 3e of the first valve 3 along the fourth line 41 connected to the second port 9b of the fourth valve 9.

The coolant introduced into the fifth port 3e of the first valve 3 is introduced into the first port 7a of the third valve 7 along the second line 21 connected to the fourth port 3d of the first valve 3.

The coolant introduced into the first port 7a of the third valve 7 is introduced into the first port 5a of the second valve 5 along the second line 21 connected to the second port 7b of the third valve 7.

The coolant introduced into the first port 5a of the second valve 5 passes through the electrical equipment 32 along the third line 31 connected to the fourth port 5d of the second valve 5, and then is introduced into the third port 5c of the second valve 5.

Here, the electrical equipment 32 may be effectively cooled by the coolant which passes through the battery module 52 from the radiator 12 first and then flows along the second line 21 and the third line 31.

The coolant introduced into the third port 5c of the second valve 5 is introduced into the third port 3c of the first valve 3 along the second line 21 connected to the second port 5b of the second valve 5, and then discharged to the second port 3b of the first valve 3.

The coolant discharged to the second port 3b of the first valve 3 may be circulated along the first line 11 and cooled through heat exchange with outside air while passing through the radiator 12.

That is, in the present embodiment, the first circuit 10, the second circuit 20, the third circuit 30, the fourth circuit 40, and the fifth circuit 50 may be connected to each other by the operations of the first, second, third, and fourth valves 3, 5, 7, and 9.

Accordingly, the coolant cooled by the radiator 12 can efficiently cool the electrical equipment 32 and the battery module 52 while repeating the operation as described above.

Meanwhile, as the operations of the sixth circuit 60 and the seventh circuit 70 are stopped, the coolant may not flow in the sixth and seventh circuits 60 and 70. Moreover, the CE module 80 is not activated.

In the present embodiment, the operation for cooling the electrical equipment 32 and the battery module 52 according to the cooling mode of the vehicle will be described with reference to FIG. 3.

Figure 3:
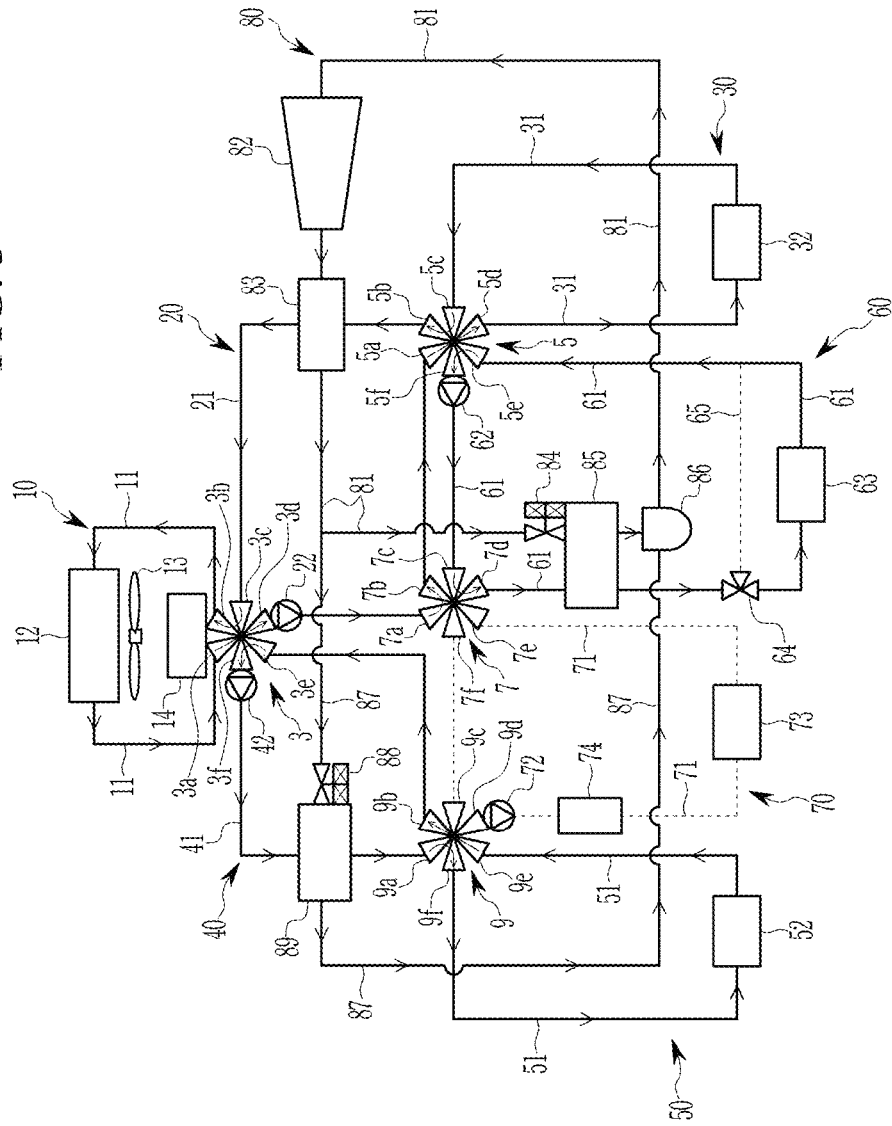
FIG. 3 is an operation state diagram for cooling the electrical equipment and the battery module in a cooling mode of the vehicle in the heat pump system for a vehicle according to one embodiment of the present invention.

FIG. 3 is an operation state diagram for cooling the electrical equipment and the battery module in the cooling mode of the vehicle in the heat pump system for a vehicle according to one embodiment of the present invention.

Referring to FIG. 3, in the CE module 80, each component operates to cool the vehicle interior, and the refrigerant circulates along the refrigerant line 81 and the refrigerant connection line 87.

Moreover, in the first circuit 10, the first line 11 connected to the first port 3a of the first valve 3 is connected to the second line 21 connected to the fourth port 3d of the first valve 3.

The second line 21 connected to the fourth port 3d of the first valve 3 is connected to the first port 5a of the second valve 5 through the first port 7a of the third valve 7 and the second port 7b of the third valve 7.

The second line 21 connected to the first port 5a of the second valve 5 is connected to the third line 31 connected from the first port 5a of the second valve 5 to the fourth port 5d of the second valve 5.

The third line 31 passing through the electrical equipment 32 and connected to the third port 5c of the second valve 5 is connected to the second line 21 through the second port 5b of the second valve 5.

Moreover, the second line 21 passing through the condenser 83 and connected to the third port 3c of the first valve 3 is connected to the first line 11 connected to the second port 3b of the first valve 3.

In this state, the first water pump may be operated so that the coolant cooled by the radiator 12 circulates along the first line 11, the second line 21, and the third line 31.

Then, the coolant cooled by the radiator 12 can efficiently cool the electrical equipment 32 along the first line 11, the second line 21, and the third line 31.

Thereafter, the coolant that has passed through the electrical equipment 32 performs heat exchange with the refrigerant supplied to the condenser 83 while passing through the condenser 83 along the second line 21 connected to the third line 31.

Meanwhile, in the fourth circuit 40, the fourth line 41 connected to the sixth port 3f of the first valve 3 passes through the chiller 89. Here, the coolant passing through the chiller 89 along the fourth line 41 may be cooled while performing heat exchange with the refrigerant supplied to the chiller 89.

The fourth line 41 passing through the chiller 89 is connected to the fifth line 51 connected from the first port 9a of the fourth valve 9 to the sixth port 9f of the fourth valve 9.

The fifth line 51 passing through the battery module 52 and connected to the fifth port 9e of the fourth valve 9 is connected to the fourth line 41 connected to the second port 9b of the fourth valve 9 from the fifth port 9e of the fourth valve 9.

The fourth line 41 connected to the second port 9b of the fourth valve 9 is connected to the chiller 89 again through the fifth port 3e of the first valve 3 and the sixth port 3f of the first valve 3.

In this state, the second water pump 42 is operated so that coolant is independently circulated from the fourth circuit 40 along the fifth circuit 50.

Then, the coolant discharged to the sixth port 3f of the first valve 3 is introduced into the first port 9a of the fourth valve 9 along the fourth line 41, and then discharged to the sixth port 9f of the fourth valve 9.

The coolant discharged to the sixth port 9f of the fourth valve 9 passes through the battery module 52 along the fifth line 51, and then is introduced into the fifth port 9e of the fourth valve 9 and discharged to the second port 9b of the fourth valve 9.

The coolant discharged to the second port 9b of the fourth valve 9 is introduced into the fifth port 3e of the first valve 3 along the fourth line 41, and then may flow along the fourth line 41 connected to the sixth port 3f of the first valve 3 again.

That is, the fourth circuit 40 and the fifth circuit 50 are not connected to the first, second, third, sixth, and seventh circuits 10, 20, 30, 60, and 70 by the operations of the first valve 3 and the fourth valve 9, and may form an independent closed circuit.

Accordingly, the coolant cooled while passing through the chiller 89 may be circulated through the fourth line 41 and the fifth line 51 to cool the battery module 52 through the operation of the second water pump 42.

That is, the battery module 52 can be efficiently cooled by the coolant cooled while passing through the chiller 89 along the fourth line 41 and the fifth line 51.

Moreover, in the sixth circuit 60, the sixth line 61 may form an independent closed circuit through the fifth port 5e and the sixth port 5f of the second valve 5 and the third port 7c and the fourth port 7d of the third valve 7 so that the coolant circulates independently along the sixth line 61 through the operation of the third water pump 62.

Here, the branch line 65 may be closed through the operation of the fifth valve 64.

That is, the coolant circulated in the sixth circuit 60 is cooled through heat exchange with the refrigerant while passing through the evaporator 85. That is, the evaporator 85 may cool the coolant circulating along the sixth line 61 through the heat exchange between the coolant and the low-temperature refrigerant.

Accordingly, the coolant is cooled to a low temperature while passing through the evaporator 85 and is supplied to the cooler 63 along the sixth line 61 through the operation of the third water pump 62.

In addition, the operation of the fourth water pump 72 in the seventh circuit 70 is stopped, and the coolant does not flow through the seventh line 71.

Meanwhile, in the CE module 80, each component operates to cool the vehicle interior, and the refrigerant circulates along the refrigerant line 81.

First, the condenser 83 condenses the refrigerant using coolant flowing along the second line 21.

Then, the condensed refrigerant is introduced into the evaporator 85 and the chiller 89 in an expanded state along the refrigerant line 81 and the refrigerant connection line 87 by the operations of the first expansion valve 84 and the second expansion valve 88.

Accordingly, the evaporator 85 can cool the coolant circulating along the sixth line 61 by the heat exchange with the low-temperature refrigerant. Accordingly, the low-temperature coolant cooled by the evaporator 85 may be supplied to the cooler 63 along the sixth line 61 through the operation of the third water pump 62.

Then, the refrigerant that has passed through the evaporator 85 and the chiller 89 passes through the accumulator 86 connected through the refrigerant connection line 87 and the refrigerant line 81 and is supplied to the compressor 82.

The refrigerant supplied to the accumulator 86 is separated into gas and liquid, and in the refrigerant separated into gas and liquid, a gas refrigerant is supplied to the compressor 82.

The refrigerant discharged from the compressor 82 is supplied to the condenser 83.

In this state, the outside air introduced into the HVAC module (not shown) is cooled through heat exchange with the low-temperature coolant introduced into the cooler 63. Then, the cooled outside air is directly introduced into the interior of the vehicle, thereby cooling the vehicle interior.

Meanwhile, the refrigerant supplied to the chiller 89 may be cooled by heat exchange between the coolant circulating along the fourth line 41 and the fifth line 51 and the low-temperature refrigerant.

The low-temperature coolant cooled by the chiller 89 is supplied to the battery module 52 along the fourth line 41 and the fifth line 51 through the operation of the second water pump 42.

Accordingly, the battery module 52 can be efficiently cooled by the low-temperature coolant supplied to the fifth line 51.

In the present embodiment, an operation for recovering the external heat source and waste heat of the electrical equipment 32 in the heating mode of the vehicle will be described with reference to FIG. 4.

Figure 4:
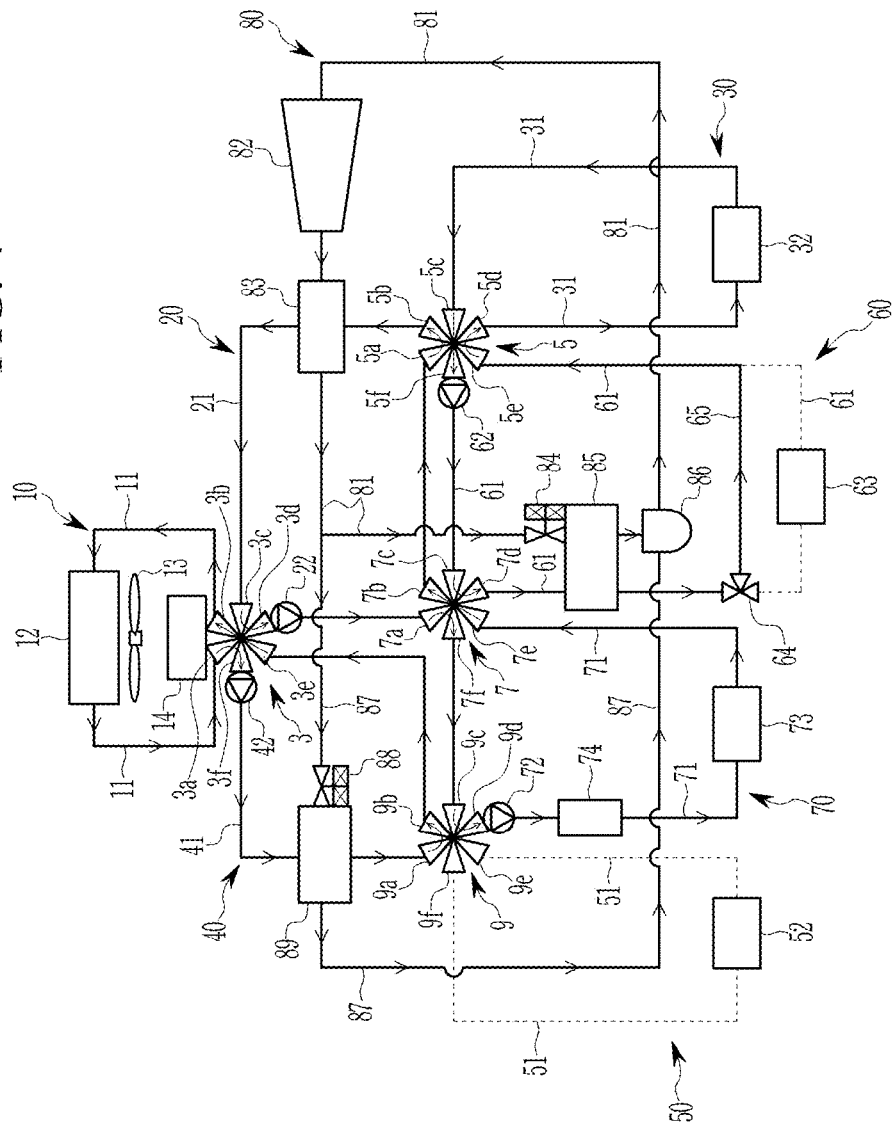
FIG. 4 is an operation state diagram for recovering an external heat source and waste heat of the electrical equipment in a heating mode of the vehicle in the heat pump system for a vehicle according to one embodiment of the present invention.

FIG. 4 is an operation state diagram for recovering the external heat source and waste heat of the electrical equipment in the heating mode of the vehicle in the heat pump system for a vehicle according to one embodiment of the present invention.

Referring to FIG. 4, the heat pump system may absorb waste heat of the electrical equipment 32 and an external heat source from outside air in the heating mode of the vehicle.

Here, in the CE module 80, each component operates to heat the vehicle interior, and the refrigerant circulates along the refrigerant line 81 and the refrigerant connection line 87.

First, the first line 11 connected to the first port 3a of the first valve 3 is connected to the fourth line 41 connected to the sixth port 3f of the first valve 3.

The fourth line 41 connected from the sixth port 3f of the first valve 3 to the first port 9a of the fourth valve 9 through the chiller 89 is connected to the fifth port 3e of the first valve 3 from the second port 9b of the fourth valve 9.

The fourth line 41 connected to the fifth port 3e of the first valve 3 is connected to the first line 11 connected from the fifth port 3e of the first valve 3 to the second port 3b of the first valve 3.

Accordingly, the first circuit 10 and the fourth circuit 40 may be connected to each other by the operation of the first and fourth valves 3 and 9. Therefore, the interconnected first and fourth circuits 10 and 40 may form a closed circuit independent of the second, third, fifth, sixth, and seventh circuits 20, 30, 50, 60, and 70.

In this state, the second water pump 42 may be operated so that the coolant passing through the radiator 12 circulates along the first line 11 and the fourth line 41.

Here, the radiator 12 cools the coolant through the heat exchange with the outside air, and the coolant may absorb the external heat source.

Then, the chiller 89 may recover the external heat source absorbed from the coolant while evaporating the expanded refrigerant through heat exchange with the coolant.

Meanwhile, the second line 21 connected to the fourth port 3d of the first valve 3 is connected to the seventh line 71 connected from the first port 7a of the third valve 7 to the sixth port 7f of the third valve 7.

The seventh line 71 connected to the sixth port 7f of the third valve 7 passes through the heater 73 from the third port 9c of the fourth valve 9 through the fourth port 9d of the fourth valve 9, and then is connected to the fifth port 7e of the third valve 7.

The seventh line 71 connected to the fifth port 7e of the third valve 7 is connected to the second line 21 connected to the second port 7b of the third valve 7.

Moreover, the second line 21 connected to the second port 7b of the third valve 7 passes through the condenser 83 from the first port 5a of the second valve 5 through the second port 5b of the second valve 5, and then is connected to the third port 3c of the first valve 3.

Accordingly, the second circuit 20 may be connected to the seventh circuit 70. In addition, the second circuit 20 and the seventh circuit 70 may form a closed circuit independent of the first, third, fourth, fifth, and sixth circuits 10, 30, 40, 50, and 60.

In this state, the first water pump 22 and the fourth water pump 72 may be operated so that the coolant is circulated along the second line 21 and the seventh line 71, respectively.

Then, in the seventh circuit 70, the coolant whose temperature is increased through heat exchange with refrigerant in the condenser 83 is supplied to the heater 73 while being circulated through the second line 21 and the seventh line 71, and thus, indoor heating may be performed.

In this case, the coolant heater 74 is selectively operated when the temperature of the coolant circulating through the seventh line 71 is lower than the set temperature.

The coolant heater 74 may increase the temperature of the coolant and supply the coolant to the heater 73.

Meanwhile, the third line 31 connected to the third port 5c of the second valve 5 is connected to the sixth line 61 connected to the sixth port 5f of the second valve 5.

The sixth line 61 connected to the sixth port 5f of the second valve 5 passes through the evaporator 85 from the third port 7c of the third valve 7 through the fourth port 7d of the third valve 7, and then is connected to the branch line 65 opened by the operation of the fifth valve 64.

Moreover, a part of the sixth line 61 connected to the branch line 65 is connected to the third line 31 from the fifth port 5e of the second valve 5 through the fourth port 5d of the second valve 5 without passing through the cooler 63.

The third line 31 connected to the fourth port 5d of the second valve 5 passes through the electrical equipment 32 and is connected to the third port 5c of the second valve 5.

Accordingly, the third circuit 30 is connected to the fifth circuit 50. In this state, the coolant may be operated to circulate along the third line 31 and the sixth line 61.

Then, the coolant that has passed through the electrical equipment 32 continues to circulate along the third line 31 and the sixth line 61 without passing through the radiator 12 and absorbs waste heat from the electrical equipment 32, and thus, the temperature of the coolant increases.

The coolant whose temperature has increased may be heat-exchanged with the refrigerant while passing through the evaporator 85. In this case, the refrigerant supplied to the evaporator 85 absorbs the waste heat of the electrical equipment 32 and is evaporated while exchanging heat with the coolant whose temperature has increased, and thus, the temperature of the refrigerant may increase.

That is, the coolant whose temperature is increased through this operation can be recovered while increasing the temperature of the refrigerant discharged from the evaporator 85. Meanwhile, the operation of the fifth circuit 50 may be stopped.

Moreover, in the CE module 80, the condenser 83 condenses the refrigerant using coolant flowing along the second line 21.

Then, the condensed refrigerant is introduced into the evaporator 85 and the chiller 89 in an expanded state along the refrigerant line 81 and the refrigerant connection line 87 by the operations of the first expansion valve 84 and the second expansion valve 88.

Accordingly, the evaporator 85 may recover the waste heat of the electrical equipment 32 from the coolant while performing heat exchange between the coolant circulating along the sixth line 61 and the low-temperature refrigerant.

Then, the refrigerant that has passed through the evaporator 85 and the chiller 89 passes through the accumulator 86 connected through the refrigerant connection line 87 and the refrigerant line 81 and is supplied to the compressor 82.

The refrigerant supplied to the accumulator 86 is separated into gas and liquid, and in the refrigerant separated into the gas and liquid, a gas refrigerant is supplied to the compressor 82.

The refrigerant discharged from the compressor 82 is supplied to the condenser 83.

Here, in the second circuit 20 and the seventh circuit 70, the coolant whose temperature has increased through heat exchange with the refrigerant in the condenser 83 is supplied to the heater 73 while being circulated to the second line 21 and the seventh line 71, and thus, indoor heating may be performed.

Accordingly, when the outside air introduced from the outside passes through the cooler 63 to which coolant is not supplied, the outside air is introduced into an uncooled room temperature state. The introduced outdoor air is converted to a high-temperature state while passing through the heater 73, and the high-temperature outdoor air is introduced into the vehicle interior, whereby heating of the vehicle interior can be implemented.

That is, the heat pump system according to the present embodiment absorbs the external heat source from the chiller 89 in the heating mode of the vehicle, and absorbs the waste heat of the electrical equipment 32 from the evaporator 85 to use the waste heat in order to increase the temperature of the refrigerant. Therefore, it is possible to reduce the power consumption of the compressor 82 and improve the heating efficiency.

An operation of recovering waste heat of the electrical equipment 32 and the battery module 52 in the heating mode of the vehicle will be described with reference to FIG. 5.

Figure 5:
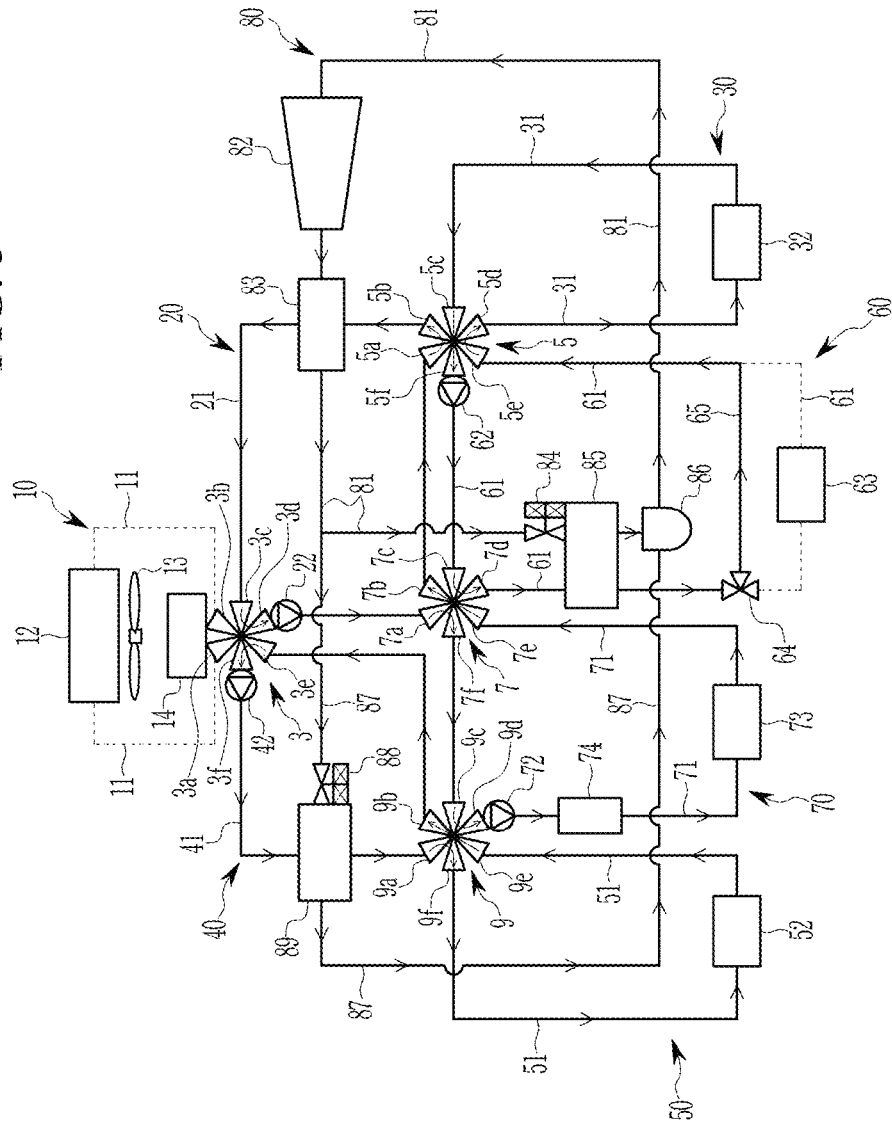
FIG. 5 is an operation state diagram for recovering waste heat of the electrical equipment and the battery module in the heating mode of the vehicle in the heat pump system for a vehicle according to one embodiment of the present invention.

FIG. 5 is an operation state diagram for recovering the waste heat of the electrical equipment and the battery module in a heating mode of the vehicle in the heat pump system for a vehicle according to one embodiment of the present invention.

Referring to FIG. 5, when the waste heat of the electrical equipment 32 and the battery module 52 is recovered in the heating mode of the vehicle, the CE module 80 operates each component to heat the vehicle interior, and thus, the refrigerant is circulated along the refrigerant line 81 and the refrigerant connection line 87.

At the same time, the operation of the first circuit 10 is stopped.

In this state, in the fourth circuit 40, the fourth line 41 connected to the sixth port 3f of the first valve 3 passes through the chiller 89. Here, the coolant passing through the chiller 89 along the fourth line 41 may be cooled through heat exchange with the refrigerant supplied to the chiller 89.

The fourth line 41 passing through the chiller 89 is connected to the fifth line 51 connected from the first port 9a of the fourth valve 9 to the sixth port 9f of the fourth valve 9.

The fifth line 51 passing through the battery module 52 and connected to the fifth port 9e of the fourth valve 9 is connected to the fourth line 41 connected from the fifth port 9e of the fourth valve 9 to the second port 9b of the fourth valve 9.

The fourth line 41 connected to the second port 9b of the fourth valve 9 is connected to the chiller 89 again through the fifth port 3e of the first valve 3 and the sixth port 3f of the first valve 3.

In this state, the second water pump 42 is operated so that coolant is independently circulated from the fourth circuit 40 along the fifth circuit 50.

Then, the coolant discharged to the sixth port 3f of the first valve 3 is introduced into the first port 9a of the fourth valve 9 along the fourth line 41, and then discharged to the sixth port 9f of the fourth valve 9.

The coolant discharged to the sixth port 9f of the fourth valve 9 passes through the battery module 52 along the fifth line 51, and then is introduced into the fifth port 9e of the fourth valve 9 and discharged to the second port 9b of the fourth valve 9.

The coolant discharged to the second port 9b of the fourth valve 9 flows into the fifth port 3e of the first valve 3 along the fourth line 41, and then may flow again along the fourth line 41 connected to the sixth port 3f of the first valve 3.

That is, the fourth circuit 40 and the fifth circuit 50 are not connected to the first, second, third, sixth, and seventh circuits 10, 20, 30, 60, and 70 by the operations of the first valve 3 and the fourth valve 9, and may form an independent closed circuit.

Accordingly, the coolant cooled while passing through the chiller 89 may circulate the fourth line 41 and the fifth line 51 to cool the battery module 52 through the operation of the second water pump 42.

That is, the battery module 52 can be efficiently cooled by the coolant cooled while passing through the chiller 89 along the fourth line 41 and the fifth line 51.

Here, the waste heat generated in the battery module 52 increases the temperature of the coolant circulating in the fifth line 51.

The coolant whose temperature has increased passes through the chiller 89 along the fifth line 51 and the fourth line 41 by the operation of the second water pump 42, and may be recovered while increasing the temperature of the refrigerant discharged from the chiller 89.

Meanwhile, the second line 21 connected to the fourth port 3d of the first valve 3 is connected to the seventh line 71 connected from the first port 7a of the third valve 7 to the sixth port 7f of the third valve 7.

The seventh line 71 connected to the sixth port 7f of the third valve 7 passes through the heater 73 from the third port 9c of the fourth valve 9 through the fourth port 9d of the fourth valve 9, and then is connected to the fifth port 7e of the third valve 7.

The seventh line 71 connected to the fifth port 7e of the third valve 7 is connected to the second line 21 connected to the second port 7b of the third valve 7.

In addition, the second line 21 connected to the second port 7b of the third valve 7 passes through the condenser 83 from the first port 5a of the second valve 5 through the second port 5b of the second valve 5, and then is connected to the third port 3c of the first valve 3.

Accordingly, the second circuit 20 may be connected to the seventh circuit 70. In addition, the second circuit 20 and the seventh circuit 70 form a closed circuit independent of the first, third, fourth, fifth, and sixth circuits 10, 30, 40, 50, and 60.

In this state, the first water pump 22 and the fourth water pump 72 may be operated so that the coolant is circulated along the second line 21 and the seventh line 71.

Then, in the seventh circuit 70, the coolant whose temperature has increased through the heat exchange with refrigerant in the condenser 83 is supplied to the heater 73 while being circulated through the second line 21 and the seventh line 71, and thus, indoor heating may be performed.

In this case, the coolant heater 74 is selectively operated when the temperature of the coolant circulating in the seventh line 71 is lower than the set temperature.

The coolant heater 74 may increase the temperature of the coolant and supply the coolant to the heater 73.

Meanwhile, the third line 31 connected to the third port 5c of the second valve 5 is connected to the sixth line 61 connected to the sixth port 5f of the second valve 5.

The sixth line 61 connected to the sixth port 5f of the second valve 5 passes through the evaporator 85 from the third port 7c of the third valve 7 through the fourth port 7d of the third valve 7, and then is connected to the branch line 65 opened by the operation of the fifth valve 64.

Moreover, a part of the sixth line 61 connected to the branch line 65 is connected to the third line 31 through the fourth port 5d of the second valve 5 from the fifth port 5e of the second valve 5 without passing through the cooler 63.

The third line 31 connected to the fourth port 5d of the second valve 5 passes through the electrical equipment 32 and is connected to the third port 5c of the second valve 5.

Accordingly, the third circuit 30 is connected to the fifth circuit 50. In this state, the coolant may be operated to circulate along the third line 31 and the sixth line 61.

Then, the coolant that has passed through the electrical equipment 32 continues to circulate along the third line 31 and the sixth line 61 without passing through the radiator 12 and absorbs the waste heat from the electrical equipment 32. Therefore, the temperature of the coolant increases.

The coolant whose temperature has increased may be heat-exchanged with the refrigerant while passing through the evaporator 85. In this case, the refrigerant supplied to the evaporator 85 absorbs the waste heat of the electrical equipment 32 and evaporates through the heat exchange with the coolant whose temperature has increased, and thus, the temperature of the coolant may increase.

That is, the coolant whose temperature has increased through this operation may be recovered while increasing the temperature of the refrigerant discharged from the evaporator 85.

Meanwhile, in the CE module 80, the condenser 83 condenses the refrigerant using coolant flowing along the second line 21.

Then, the condensed refrigerant is introduced into the evaporator 85 and the chiller 89 in an expanded state along the refrigerant line 81 and the refrigerant connection line 87 by the operations of the first expansion valve 84 and the second expansion valve 88.

Accordingly, the evaporator 85 may recover the waste heat of the electrical equipment 32 from the coolant while performing heat exchange between the coolant circulating along the sixth line 61 and the low-temperature refrigerant.

Then, the refrigerant that has passed through the evaporator 85 and the chiller 89 passes through the accumulator 86 connected through the refrigerant connection line 87 and the refrigerant line 81 and is supplied to the compressor 82.

The refrigerant supplied to the accumulator 86 is separated into gas and liquid, and in the refrigerant separated into gas and liquid, a gas refrigerant is supplied to the compressor 82.

The refrigerant discharged from the compressor 82 is supplied to the condenser 83.

Here, in the second circuit 20 and the seventh circuit 70, the coolant whose temperature has increased through heat exchange with the refrigerant in the condenser 83 is supplied to the heater 73 while being circulated to the second line 21 and the seventh line 71, and thus, indoor heating may be performed.

Accordingly, when the outside air introduced from the outside passes through the cooler 63 to which coolant is not supplied, the outside air is introduced into an uncooled room temperature state. The introduced outdoor air is converted to a high-temperature state while passing through the heater 73, and the high-temperature outdoor air is introduced into the vehicle interior, whereby heating of the vehicle interior can be implemented.

That is, the heat pump system 1 according to the present embodiment uses the waste heat generated from the electrical equipment 32 and the battery module 52 in the heating mode of the vehicle to increase the temperature of the refrigerant. Therefore, it is possible to reduce the power consumption of the compressor 82 and improve the heating efficiency.

Meanwhile, although not shown in FIG. 5, when the waste heat is recovered only from the electrical equipment 32 in the heating mode of the vehicle, the operation of the fifth circuit 50 may be stopped by the operation of the fourth valve 9.

Then, the coolant circulating through the third line 31 recovers the waste heat generated from the electrical equipment 32 to increase the temperature. The coolant whose temperature has increased may increase the temperature of refrigerant through the heat exchange with refrigerant while passing through the evaporator 85.

Conversely, when the waste heat is recovered only from the battery module 52 in the heating mode of the vehicle, the operation of the third circuit 30 may be stopped by the operation of the second valve 5.

Then, the coolant circulating through the fifth line 51 recovers the waste heat generated in the battery module 52 to increase the temperature. The coolant whose temperature is increased may increase the temperature of the refrigerant through heat exchange with the refrigerant in the chiller 89.

In the present embodiment, an operation for recovering the external heat source in the heating and dehumidifying mode of the vehicle will be described with reference to FIG. 6.

Figure 6:
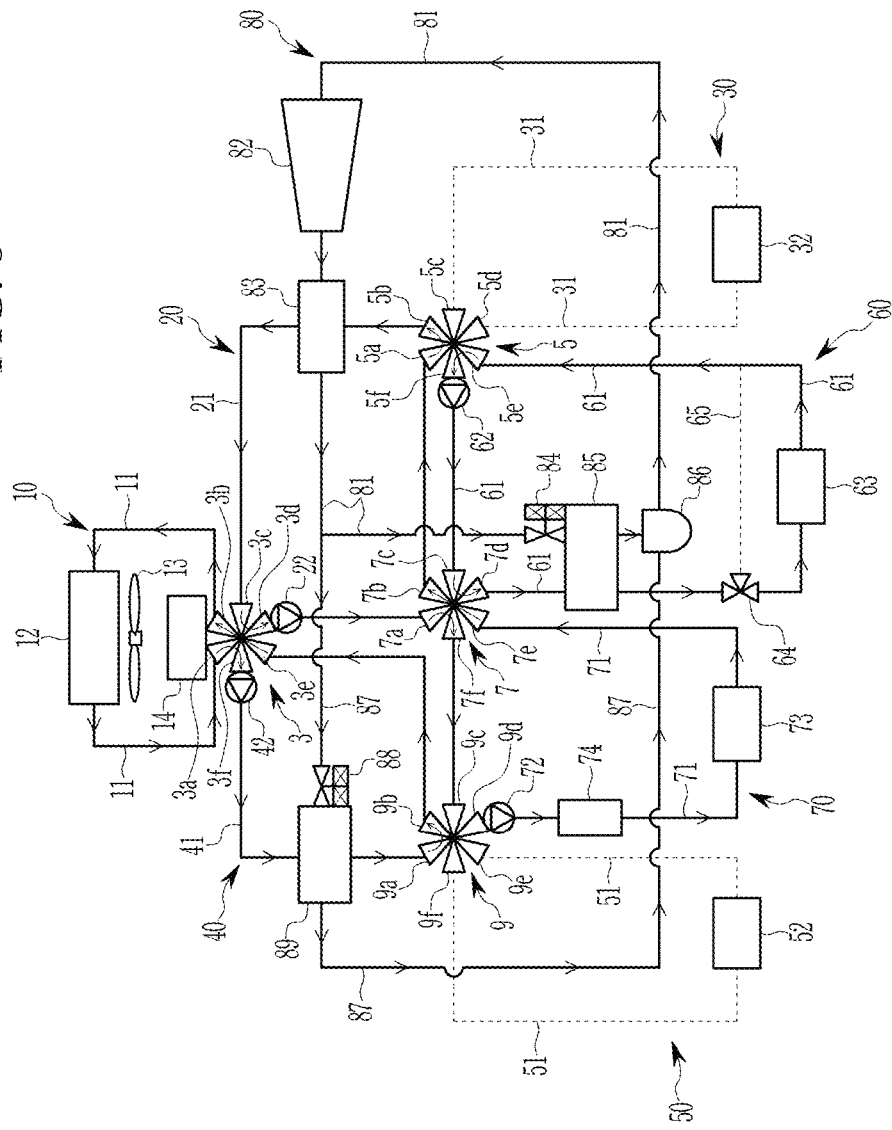
FIG. 6 is an operation state diagram for recovering an external heat source in a heating and dehumidifying mode of the vehicle in the heat pump system for a vehicle according to one embodiment of the present invention.

FIG. 6 is an operation state diagram for recovering the external heat source in the heating and dehumidifying mode of the vehicle in the heat pump system for a vehicle according to one embodiment of the present invention.

Referring to FIG. 6, the heat pump system may absorb the external heat source from the outside air in the heating and dehumidifying mode of the vehicle.

First, the first line 11 connected to the first port 3*a* of the first valve 3 is connected to the fourth line 41 connected to the sixth port 3*f* of the first valve 3.

The fourth line 41 connected to the first port 9*a* of the fourth valve 9 from the sixth port 3*f* of the first valve 3 through the chiller 89 is connected from the second port 9*b* of the fourth valve 9 to the fifth port 3*e* of the first valve 3.

The fourth line 41 connected to the fifth port 3*e* of the first valve 3 is connected to the first line 11 connected from the fifth port 3*e* of the first valve 3 to the second port 3*b* of the first valve 3.

Accordingly, the first circuit 10 and the fourth circuit 40 may be connected to each other by the operations of the first and fourth valves 3 and 9. Accordingly, the interconnected first and fourth circuits 10 and 40 may form a closed circuit independent of the second, third, fifth, sixth, and seventh circuits 20, 30, 50, 60, and 70.

In this state, the second water pump 42 may be operated so that the coolant passing through the radiator 12 circulates along the first line 11 and the fourth line 41.

Here, the radiator 12 may cool the coolant through heat exchange with the outside air, and the coolant may absorb the external heat source.

Then, the chiller 89 may recover the external heat source absorbed from the coolant while evaporating the expanded refrigerant through heat exchange with the coolant.

Meanwhile, the second line 21 connected to the fourth port 3*d* of the first valve 3 is connected to the seventh line 71 connected from the first port 7*a* of the third valve 7 to the sixth port 7*f* of the third valve 7.

The seventh line 71 connected to the sixth port 7*f* of the third valve 7 passes through the heater 73 from the third port 9*c* of the fourth valve 9 through the fourth port 9*d* of the fourth valve 9, and then is connected to the fifth port 7*e* of the third valve 7.

The seventh line 71 connected to the fifth port 7*e* of the third valve 7 is connected to the second line 21 connected to the second port 7*b* of the third valve 7.

In addition, the second line 21 connected to the second port 7*b* of the third valve 7 passes through the condenser 83 from the first port 5*a* of the second valve 5 through the second port 5*b* of the second valve 5, and then is connected to the third port 3*c* of the first valve 3.

Accordingly, the second circuit 20 may be connected to the seventh circuit 70. In addition, the second circuit 20 and the seventh circuit 70 form a closed circuit independent of the first, third, fourth, fifth, and sixth circuits 10, 30, 40, 50, and 60.

In this state, the first water pump 22 and the fourth water pump 72 may be operated so that the coolant is circulated along the second line 21 and the seventh line 71.

Then, in the seventh circuit 70, the coolant whose temperature has increased through the heat exchange with refrigerant in the condenser 83 is supplied to the heater 73 while being circulated through the second line 21 and the seventh line 71, and thus, indoor heating may be performed.

In this case, the coolant heater 74 is selectively operated when the temperature of the coolant circulating in the seventh line 71 is lower than the set temperature.

The coolant heater 74 may increase the temperature of the coolant and supply the coolant to the heater 73.

Meanwhile, in the sixth circuit 60, the sixth line 61 may form an independent closed circuit by the sixth port 5f of the second valve 5, the third port 7c of the third valve 7, the fourth port 7d of the third valve 7, and the fifth port 5e of the second valve 5.

Here, the branch line 65 may be closed by the operation of the fifth valve 64.

Accordingly, the third water pump 62 operates so that coolant sequentially passes through the evaporator 85 and the cooler 63 along the sixth line 61.

That is, the coolant circulated in the sixth circuit 60 is cooled through heat exchange with the refrigerant while passing through the evaporator 85. That is, the evaporator 85 may cool the coolant circulating along the sixth line 61 through the heat exchange between the coolant and the low-temperature refrigerant.

Accordingly, the coolant is cooled to a low temperature while passing through the evaporator 85 and is supplied to the cooler 63 along the sixth line 61 through the operation of the third water pump 62.

Meanwhile, the condenser 83 of the CE module 80 condenses the refrigerant using the coolant flowing along the second line 21.

Then, the condensed refrigerant is introduced into the evaporator 85 and the chiller 89 in an expanded state along the refrigerant line 81 and the refrigerant connection line 87 by the operations of the first expansion valve 84 and the second expansion valve 88.

Accordingly, the evaporator 85 can cool the coolant circulating along the sixth line 61 by the heat exchange with the low-temperature refrigerant. Accordingly, the low-temperature coolant cooled by the evaporator 85 may be supplied to the cooler 63 along the sixth line 61 through the operation of the third water pump 62.

Then, the refrigerant that has passed through the evaporator 85 and the chiller 89 passes through the accumulator 86 connected through the refrigerant connection line 87 and the refrigerant line 81 and is supplied to the compressor 82.

The refrigerant supplied to the accumulator 86 is separated into gas and liquid, and in the refrigerant separated into gas and liquid, a gas refrigerant is supplied to the compressor 82.

The refrigerant discharged from the compressor 82 is supplied to the condenser 83.

In this state, in the second circuit 20 and the seventh circuit 70, the coolant whose temperature is increased through the heat exchange with the refrigerant in the condenser 83 is supplied to the heater 73 while being circuited to the second line 21 and the seventh line 71, and thus, indoor heating may be performed.

In this case, the coolant heater 74 is selectively operated when the temperature of the coolant circulating in the seventh line 71 is lower than the set temperature. The coolant heater 74 may increase the temperature of the coolant and supply the coolant to the heater 73.

Accordingly, the outside air introduced from the outside is dehumidified while passing through the cooler 63 by the low-temperature coolant introduced into the cooler 63. Then, the outside air is converted to a high-temperature state while passing through the heater 73, and the high-temperature outside air is introduced into the vehicle interior, thereby heating and dehumidifying the interior of the vehicle.

That is, the heat pump system according to the present embodiment absorbs the external heat source from the chiller 89 in the heating and dehumidification mode of the vehicle and uses the external heat source to increase the temperature of refrigerant. Therefore, it is possible to reduce the power consumption of the compressor 82 and improve the heating efficiency.

An operation when the external heat source and the waste heat of the electrical equipment 32 are recovered in the heating mode of the vehicle and the temperature of the battery module 52 increases will be described with reference to FIG. 7.

Figure 7:
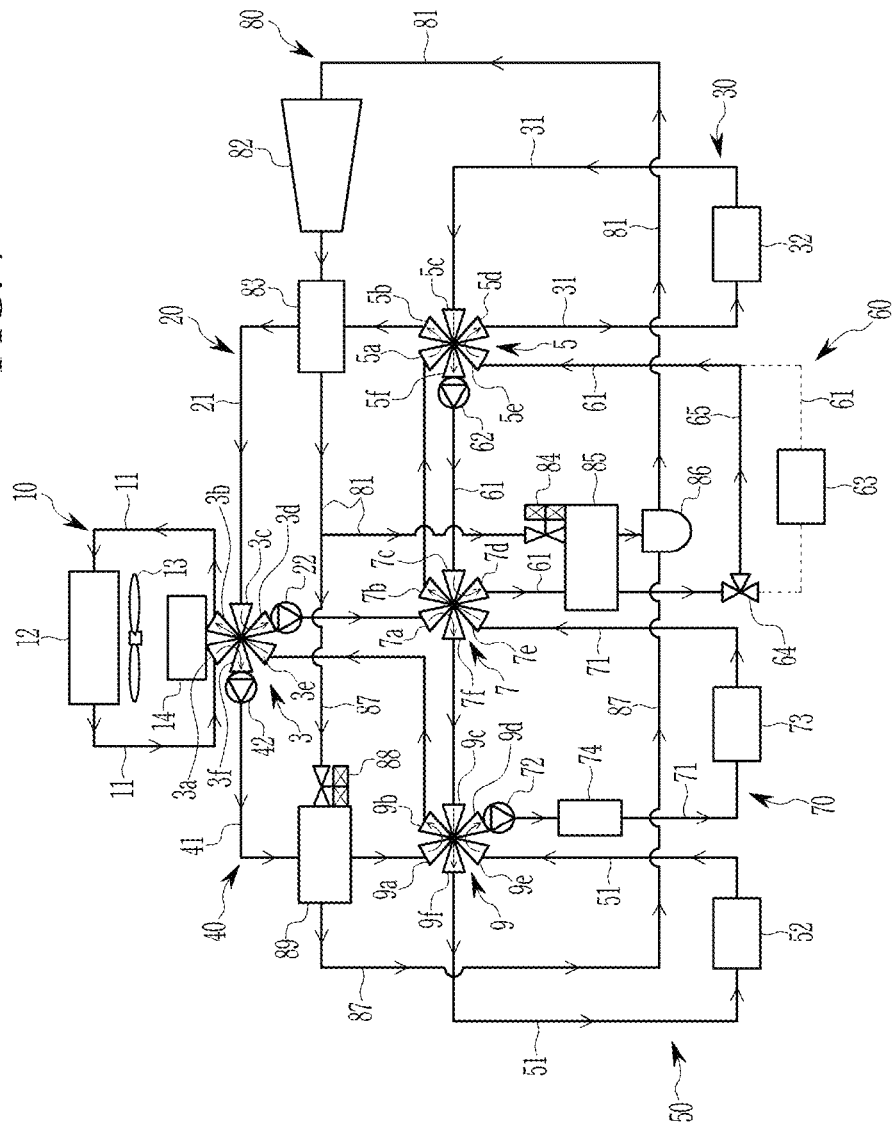
FIG. 7 is an operation state diagram for recovering the external heat source and waste heat of the electrical equipment and heating the battery module in the heating mode of the vehicle in the heat pump system for a vehicle according to one embodiment of the present invention.

FIG. 7 is an operation state diagram for recovering the external heat source and the waste heat of the electrical equipment and heating the battery module in the heating mode of the vehicle in the heat pump system for a vehicle according to one embodiment of the present invention.

Referring to FIG. 7, the heat pump system may absorb waste heat of the electrical equipment 32 and an external heat source from outside air in the heating mode of the vehicle and may increase the temperature of the battery module 52.

Here, each component of the CE module 80 operates to heat the vehicle interior, and refrigerant circulates along the refrigerant line 81.

First, the first line 11 connected to the first port 3a of the first valve 3 is connected to the fourth line 41 connected to the sixth port 3f of the first valve 3.

The fourth line 41 connected from the sixth port 3f of the first valve 3 to the first port 9a of the fourth valve 9 through the chiller 89 is connected from the second port 9b of the fourth valve 9 to the fifth port 3e of the first valve 3.

The fourth line 41 connected to the fifth port 3e of the first valve 3 is connected to the first line 11 connected from the fifth port 3e of the first valve 3 to the second port 3b of the first valve 3.

Accordingly, the first circuit 10 and the fourth circuit 40 may be interconnected by the operation of the first and fourth valves 3 and 9. Accordingly, the interconnected first and fourth circuits 10 and 40 are closed circuits independent of the second, third, fifth, sixth, and seventh circuits 20, 30, 50, 60, and 70.

In this state, the second water pump 42 may be operated so that the coolant passing through the radiator 12 circulates along the first line 11 and the fourth line 41.

Here, the radiator 12 cools the coolant through heat exchange with the outside air, and the coolant can absorb the external heat source.

Then, the chiller 89 may recover the external heat source absorbed from the coolant while evaporating the expanded refrigerant through heat exchange with the coolant.

Meanwhile, the second line 21 connected to the fourth port 3d of the first valve 3 is connected to the seventh line 71 connected from the first port 7a of the third valve 7 to the sixth port 7f of the third valve 7.

The seventh line 71 connected to the sixth port 7f of the third valve 7 is connected to the fifth line 51 from the third port 9c of the fourth valve 9 through the sixth port 9f of the fourth valve 9.

The fifth line 51 passing through the battery module 52 and connected to the fifth port 9e of the fourth valve 9 is connected to the seventh line 71 connected to the fourth port 9d of the fourth valve 9 from the fifth port 9e of the fourth valve 9.

The seventh line 71 connected to the fourth port 9d of the fourth valve 9 passes through the heater 73, and then is connected to the fifth port 7e of the third valve 7.

The seventh line 71 connected to the fifth port 7e of the third valve 7 is connected to the second line 21 connected to the second port 7b of the third valve 7.

The second line 21 connected to the second port 7b of the third valve 7 passes through the condenser 83 from the first port 5a of the second valve 5 through the second port 5b of the second valve 5, and then is connected to the third port 3c of the first valve 3.

Moreover, the second line 21 connected to the third port 3c of the first valve 3 is connected to the seventh line 71 connected to the sixth port 3f of the first valve 3 through the fourth port 3d of the first valve 3 and the first port 3a of the first valve 3.

Accordingly, the second circuit 20 may be connected to the fifth circuit 50 and the seventh circuit 70. In addition, the second circuit 20, the fifth circuit 50, and the seventh circuit 70 may form a closed circuit independent of the first, third, fourth, and sixth circuits 10, 30, 40, and 60.

In this state, the first water pump 22 and the fourth water pump 72 may each be operated to circulate along the second line 21, the fifth line 51, and the seventh line 71.

Then, the fifth circuit 50 supplies the coolant to the battery module 52 while circulating the coolant whose temperature is increased through heat exchange with refrigerant in the condenser 83 to the second line 21, the seventh line 71, and the fifth line 51, and thus, the temperature of battery module 52 may increase.

In addition, the seventh circuit 70 supplies the high-temperature coolant to the heater 73 while circulating the high-temperature coolant which has increased the temperature of the battery module 52 in the fifth circuit 50 through the seventh line 71, and thus, indoor heating may be performed.

In this case, the coolant heater 74 is selectively operated when the temperature of the coolant circulating in the seventh line 71 is lower than the set temperature.

The coolant heater 74 may increase the temperature of the coolant and supply the coolant to the heater 73.

Meanwhile, the third line 31 connected to the third port 5c of the second valve 5 is connected to the sixth line 61 connected to the sixth port 5f of the second valve 5.

The sixth line 61 connected to the sixth port 5f of the second valve 5 passes through the evaporator 85 from the third port 7c of the third valve 7 through the fourth port 7d of the third valve 7, and then is connected to the branch line 65 opened by the operation of the fifth valve 64.

Moreover, a part of the sixth line 61 connected to the branch line 65 is connected to the third line 31 through the fourth port 5d of the second valve 5 from the fifth port 5e of the second valve 5 without passing through the cooler 63.

The third line 31 connected to the fourth port 5d of the second valve 5 passes through the electrical equipment 32 and is connected to the third port 5c of the second valve 5.

Accordingly, the third circuit 30 is connected to the fifth circuit 50. In this state, the coolant may be operated to circulate along the third line 31 and the sixth line 61.

Then, the coolant that has passed through the electrical equipment 32 continues to circulate along the third line 31 and the sixth line 61 without passing through the radiator 12 and absorbs the waste heat from the electrical equipment 32. Therefore, the temperature of the coolant increases.

The coolant whose temperature has increased may be heat-exchanged with the refrigerant while passing through the evaporator 85. In this case, the refrigerant supplied to the evaporator 85 absorbs the waste heat of the electrical equipment 32 and evaporates through the heat exchange with the coolant whose temperature has increased, and thus, the temperature of the coolant may increase.

That is, the coolant whose temperature has increased through this operation may be recovered while increasing the temperature of the refrigerant discharged from the evaporator 85.

Meanwhile, in the CE module 80, the condenser 83 condenses the refrigerant using coolant flowing along the second line 21.

Then, the condensed refrigerant is introduced into the evaporator 85 and the chiller 89 in an expanded state along the refrigerant line 81 and the refrigerant connection line 87 by the operations of the first expansion valve 84 and the second expansion valve 88.

Accordingly, the evaporator 85 may recover the waste heat of the electrical equipment 32 from the coolant while performing heat exchange between the coolant circulating along the sixth line 61 and the low-temperature refrigerant.

Then, the refrigerant that has passed through the evaporator 85 and the chiller 89 passes through the accumulator 86 connected through the refrigerant connection line 87 and the refrigerant line 81 and is supplied to the compressor 82.

The refrigerant supplied to the accumulator 86 is separated into gas and liquid, and in the refrigerant separated into gas and liquid, a gas refrigerant is supplied to the compressor 82.

The refrigerant discharged from the compressor 82 is supplied to the condenser 83.

Here, in the second circuit 20 and the seventh circuit 70, the coolant whose temperature has increased through heat exchange with the refrigerant in the condenser 83 is supplied to the heater 73 while being circulated to the second line 21 and the seventh line 71, and thus, indoor heating may be performed.

Accordingly, when the outside air introduced from the outside passes through the cooler 63 to which coolant is not supplied, the outside air is introduced into an uncooled room temperature state. The introduced outdoor air is converted to a high-temperature state while passing through the heater 73, and the high-temperature outdoor air is introduced into the vehicle interior, whereby heating of the vehicle interior can be implemented.

That is, the heat pump system according to the present embodiment absorbs the external heat source from the chiller 89 in the heating mode of the vehicle, and absorbs the waste heat of the electrical equipment 32 from the evaporator 85 to use the waste heat in order to increase the temperature of the refrigerant. Therefore, it is possible to reduce the power consumption of the compressor 82 and improve the heating efficiency.

In addition, the heat pump system first supplies the coolant whose temperature has increased while passing through the condenser 83 to the battery module 52 along the second line 21, the seventh line 71, and the fifth line 51, and thus, it is possible to quickly increase the temperature of the battery module 52.

In the present embodiment, an operation for performing the heating mode of the vehicle with the waste heat of the electrical equipment 32 will be described with reference to FIG. 8.

Figure 8:
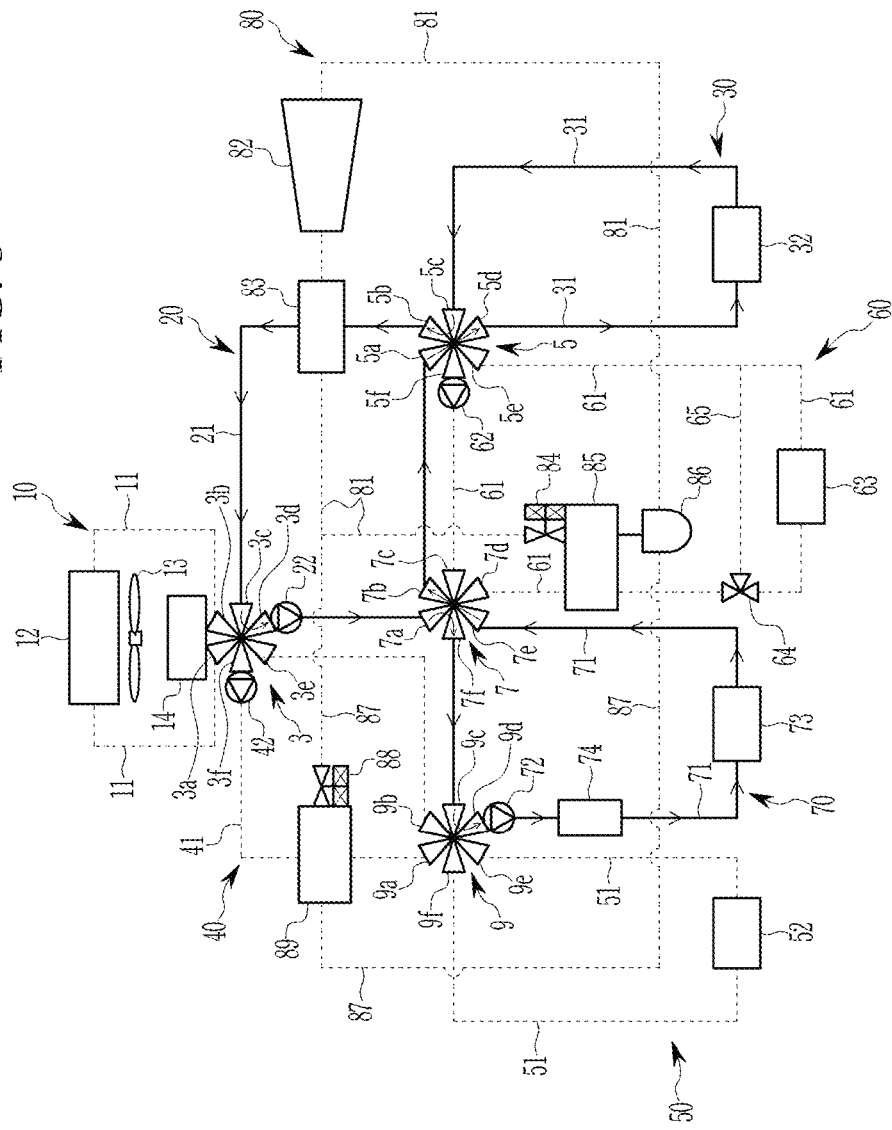
FIG. 8 is an operation state diagram for performing a heating mode using the waste heat of the electrical equipment in the heat pump system for a vehicle according to one embodiment of the present invention.

FIG. 8 is an operation state diagram for performing the heating mode using the waste heat of the electrical equipment in the heat pump system for a vehicle according to one embodiment of the present invention.

Referring to FIG. 8, the heat pump system may implement the heating of the vehicle interior by using the waste heat of the electrical equipment 32.

First, the operations of the first circuit 10, the fourth circuit 40, the fifth circuit 50, and the sixth circuit 60 are stopped.

Accordingly, the operations of the second water pump 42 and the third water pump 62 are stopped, and the flow of the coolant may be stopped in the first line 11, the fourth line 41, the fifth line 51, and the sixth line 61.

In addition, in the CE module 80, the operation of each component is stopped, thereby stopping the circulation of refrigerant.

In this state, the second line 21 connected to the fourth port 3d of the first valve 3 is connected to the seventh line 71 connected from the first port 7a of the third valve 7 to the sixth port 7f of the third valve 7.

The seventh line 71 connected to the sixth port 7f of the third valve 7 passes through the heater 73 from the third port 9c of the fourth valve 9 through the fourth port 9d of the fourth valve 9, and then is connected to the fifth port 7e of the third valve 7.

The seventh line 71 connected to the fifth port 7e of the third valve 7 is connected to the second line 21 connected to the second port 7b of the third valve 7.

The second line 21 connected to the second port 7b of the third valve 7 is connected to the first port 5a of the second valve 5.

The second line 21 connected to the first port 5a of the second valve 5 is connected to the third line 31 connected from the first port 5a of the second valve 5 to the fourth port 5d of the second valve 5.

Moreover, the third line 31 passing through the electrical equipment 32 and connected to the third port 5c of the second valve 5 is connected to the second line 21 through the second port 5b of the second valve 5.

The second line 21 passing through the condenser 83 and connected to the third port 3c of the first valve 3 is connected to the second line 21 connected to the first port 7a of the third valve 7 from the third port 3c of the first valve 3 through the fourth port 3d of the first valve 3.

By the operations of the first, second, third, and fourth valves 3, 5, 7, and 9 as described above, the second circuit 20 may be connected to the seventh circuit 70 and the third circuit 30. Here, the first water pump 22 and the fourth water pump 72 are each operated so that the coolant is circulated along the second line 21, the seventh line 71, and the third line 31.

That is, the coolant discharged to the fourth port 5d of the second valve 5 passes through the electrical equipment 32 along the third line 31. In this case, the coolant cools the electrical equipment 32, and at the same time, the temperature of the coolant is increased by the waste heat of the electrical equipment 32.

The coolant whose temperature has increased is introduced into the third port 5c of the second valve 5 along the third line 31, and is introduced into the third port 3c of the first valve 3 along the second line 21 connected to the second port 5b of the second valve 5.

Then, the coolant introduced into the third port 3c of the first valve 3 is discharged again to the fourth port 3d of the first valve 3, and introduced into the first port 7a of the third valve 7 along the second line 21.

The coolant introduced into the first port 7a of the third valve 7 is introduced into the third port 9c of the fourth valve 9 along the seventh line 71 connected to the sixth port 7f of the third valve 7.

The coolant introduced into the third port 9c of the fourth valve 9 passes through the heater 73 along the seventh line 71 through the fourth port 9d of the fourth valve 9, and then is introduced into the fifth port 7e of the third valve 7.

Here, the coolant whose temperature has increased by recovering the waste heat from the electrical equipment 32 may be supplied to the heater 73.

Moreover, the coolant introduced into the fifth port 7e of the third valve 7 is introduced into the first port 5a of the second valve 5 along the second line 21 connected to the second port 7b of the third valve 7.

Then, the coolant introduced into the first port 5a of the second valve 5 flows along the third line 31 connected to the fourth port 5d of the second valve 5.

As described above, the coolant that has passed through the electrical equipment 32 continues to circulate along the third line 31, the second line 21, and the seventh line 71 without passing through the radiator 12 and absorbs the waste heat from the electrical equipment 32 to increase the temperature.

The coolant whose temperature has increased may be introduced into the seventh line 71 through the second line 21 and may be supplied to the heater 73.

That is, the seventh circuit 70 absorbs the waste heat of the electrical equipment 32 by the operation of the fourth water pump 72 and the coolant whose temperature has increased to the seventh line 71 may be supplied to the heater 73 while circulating through the seventh line 71.

In this case, the coolant heater 74 is selectively operated when the temperature of the coolant circulating in the seventh line 71 is lower than the set temperature. The coolant heater 74 may increase the temperature of the coolant and supply the coolant to the heater 73.

Therefore, when the outside air introduced from the outside passes through the cooler 63 in which the circulation of the coolant is stopped, the outside air is introduced into an uncooled room temperature state. The introduced outdoor air is converted to a high-temperature state while passing through the heater 73, and the high-temperature outdoor air is introduced into the vehicle interior, whereby heating of the vehicle interior can be implemented.

That is, the heat pump system according to the present embodiment can heat the vehicle interior using coolant whose temperature is increased by the waste heat of the electrical equipment 32 without operating the CE module 80 in the heating mode of the vehicle. Therefore, power consumption can be reduced.

In addition, an operation in the case of increasing the temperatures of the electrical equipment 32 and the battery module 52 during initial operation in the heat pump system for a vehicle according to one embodiment of the present invention will be described with reference to FIG. 9.

Figure 9:
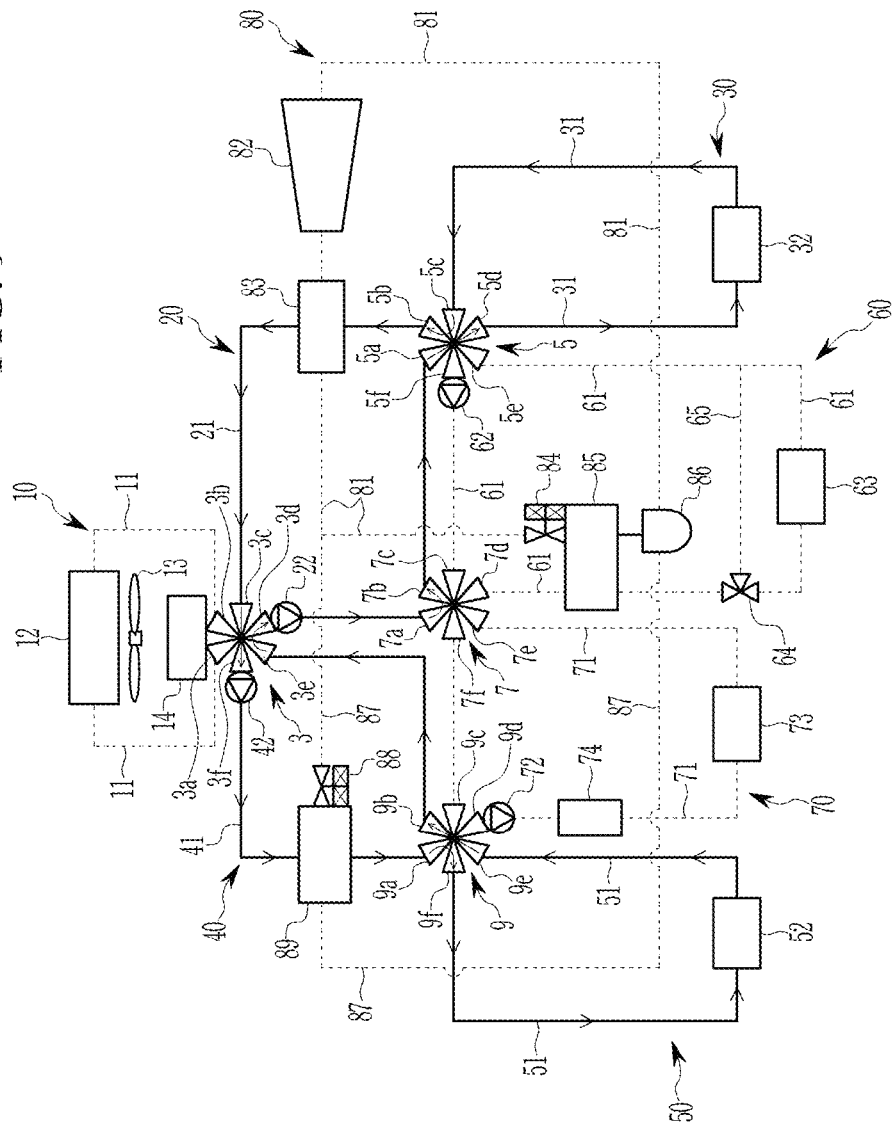
FIG. 9 is an operation state diagram for heating the electrical equipment and the battery module in the heat pump system for a vehicle according to one embodiment of the present invention.

FIG. 9 is an operation state diagram for heating the electrical equipment and the battery module in the heat pump system for a vehicle according to one embodiment of the present invention.

Referring to FIG. 9, the operations of the first circuit 10, the sixth circuit 60, and the seventh circuit 70 are stopped. Accordingly, the coolant may not flow through the first line 11, the sixth line 61, and the seventh line 71. Moreover, the operation of the CE module 80 is stopped.

In addition, the second line 21 connected to the fourth port 3d of the first valve 3 is connected from the first port 7a of the third valve 7 to the first port 5a of the second valve 5 through the second port 7b of the third valve 7.

The second line 21 connected to the first port 5a of the second valve 5 is connected to the third line 31 connected from the first port 5a of the second valve 5 to the fourth port 5d of the second valve 5.

The third line 31 passing through the electrical equipment 32 and connected to the third port 5c of the second valve 5 is connected to the second line 21 through the second port 5b of the second valve 5.

The second line 21 connected to the second port 5b of the second valve 5 is connected to the fourth line 41 connected from the third port 3c of the first valve 3 to the sixth port 3f of the first valve 3.

The fourth line 41 is connected from the first port 9a of the fourth valve 9 to the fifth line 51 connected to the sixth port 9f of the fourth valve 9.

The fifth line 51 passing through the battery module 52 and connected to the fifth port 9e of the fourth valve 9 is connected to the fourth line 41 connected from the fifth port 9e of the fourth valve 9 to the second port 9b of the fourth valve 9.

The fourth line 41 connected to the second port 9b of the fourth valve 9 is connected to the second line 21 from the fifth port 3e of the first valve 3 through the fourth port 3d of the first valve 3.

Accordingly, the second circuit 20 may be connected to the third circuit 30, the fourth circuit 40, and the fifth circuit 50 by the operations of the first, second, third, and fourth valves 3, 5, 7, and 9.

In this state, the first water pump 22 and the second water pumps 42 may each be operated so that the coolant is circulated along the second line 21, the third line 31, the fourth line 41, and the fifth line 51.

That is, the coolant discharged to the sixth port 3f of the first valve 3 is introduced into the first port 9a of the fourth valve 9 along the fourth line 41, and then discharged to the sixth port 9f of the fourth valve 9.

The coolant discharged to the sixth port 9f of the fourth valve 9 may pass through the battery module 52 along the fifth line 51, and then be introduced into the fifth port 9e of the fourth valve 9.

Thereafter, the coolant introduced into the fifth port 9e of the fourth valve 9 is introduced into the fifth port 3e of the first valve 3 along the fourth line 41 connected to the second port 9b of the fourth valve 9.

The coolant introduced into the fifth port 3e of the first valve 3 is introduced into the first port 7a of the third valve 7 along the second line 21 connected to the fourth port 3d of the first valve 3.

The coolant introduced into the first port 7a of the third valve 7 is introduced into the first port 5a of the second valve 5 along the second line 21 connected to the second port 7b of the third valve 7.

The coolant introduced into the first port 5a of the second valve 5 passes through the electrical equipment 32 along the third line 31 connected to the fourth port 5d of the second valve 5, and then is introduced into the third port 5c of the second valve 5.

The coolant introduced into the third port 5c of the second valve 5 is introduced into the third port 3c of the first valve 3 along the second line 21 connected to the second port 5b of the second valve 5, and then again discharged to the sixth port 3f of the first valve 3.

That is, in the present embodiment, the second circuit 20, the third circuit 30, the fourth circuit 40, and the fifth circuit 50 are connected to each other by the selective operations of the first, second, third, and fourth valves 3, 5, 7, and 9, and may form one closed circuit in which the coolant circulates.

Here, the waste heat generated from the electrical equipment 32 and the waste heat generated from the battery module 52 increase the temperature of the coolant circulating through the second, third, fourth, and fifth lines 21, 31, 41 and 51.

While the coolant whose temperature has increased circulates along the second, third, fourth, and fifth lines 21, 31, 41, and 51 through the operations of the first and second water pumps 22 and 42, the coolant passes through the electrical equipment 32 and the battery module 52 without passing through the radiator 12.

Accordingly, the electrical equipment 32 and the battery module 52 can be efficiently heated by the high-temperature coolant supplied to the third line 31 and the fifth line 51.

That is, during the initial driving of the vehicle, the coolant can rapidly increase the temperature of the electrical equipment 32 and the battery module 52 while repeatedly performing the above-described operation without passing through the radiator 12.

As described above, when the heat pump system for a vehicle according to the embodiments of the present invention is applied, it is possible to selectively heat-exchange heat energy generated from the refrigerant during condensation and evaporation of the refrigerant with the coolant and control an indoor temperature of the vehicle by using the heat-exchanged low-coolant or high-temperature coolant, respectively. Therefore, the system can be simplified and a layout of connection pipes through which the refrigerant circulates can be simplified.

In addition, according to embodiments of the present invention, by arranging the electrical equipment 32 and the battery module 52 in parallel through each line and the valves 3, 5, 7, and 9 so that the coolant circulates independently of the electrical equipment 32 and the battery module 52, independent cooling of the electrical equipment 32 and the battery module 52 is possible, and waste heat of the electrical equipment 32 and the battery module 52 can be simultaneously recovered in the heating mode of the vehicle, or only the waste heat of any one can be selectively recovered. Therefore, it is possible to improve the overall marketability of the vehicle.

In addition, according to embodiments of the present invention, it is possible to improve heating efficiency of the vehicle by selectively using the waste heat of the electrical equipment 32 and the battery module 52 and an external heat source in the heating mode of the vehicle and effectively control the temperature of the battery module 52 so that optimal performance of the battery module 52 is exhibited to increase the overall mileage of the vehicle.

In addition, by packaging the centralized energy module 80 that generates heat energy through condensation and evaporation of the refrigerant, and by using high-performance refrigerant, the size and weight can be reduced, and it is possible to prevent the occurrence of noise, vibration, and operation instability compared to the conventional air conditioner.

Furthermore, it is possible to reduce the manufacturing cost and reduce the weight through the simplification of the entire system, and it is possible to improve space utilization by minimizing the components.

As described above, although the present invention has been described with reference to limited embodiments and drawings, the present invention is not limited thereto, and of course, various modifications and variations are possible within the scope of the technical spirit of the present invention and claims to be described below by those of ordinary skill in the art to which the present invention pertains.

What is claimed is:

1. A heat pump system for a vehicle, the system comprising:
   a first circuit comprising a radiator and a first valve provided in a first line through which a coolant is circulated;
   a second circuit comprising a second line that is connected to the first valve, and a first water pump, a second valve, and a third valve provided in the second line, wherein the coolant is circulated by operations of the first, second, and third valves and the first water pump;
   a third circuit comprising a third line that is connected to the second valve and electrical equipment provided in the third line through which the coolant is circulated by operation of the second valve;
   a fourth circuit comprising a fourth line that is connected to the first valve separately from the second line, and a second water pump and a fourth valve provided in the fourth line through which the coolant is circulated by operations of the first and fourth valves and the second water pump;
   a fifth circuit comprising a fifth line that is connected to the fourth valve and a battery module provided in the fifth line through which the coolant is circulated by operation of the fourth valve;
   a sixth circuit comprising a sixth line that is connected through the second valve and the third valve to cool a vehicle interior, and a third water pump and a cooler provided in the sixth line through which the coolant is circulated by operation of the third water pump;
   a seventh circuit comprising a seventh line that is connected through the third valve and the fourth valve to heat the vehicle interior, and a fourth water pump and a heater provided in the seventh line through which the coolant is circulated by operation of the fourth water pump; and
   a centralized energy module comprising:
      a condenser provided in the second line to supply a high-temperature coolant to the heater;
      a chiller provided in the fourth line; and
      an evaporator provided in the sixth line to supply a low-temperate coolant to the cooler,
   wherein the centralized energy module is configured to selectively heat exchange heat energy generated during condensation and evaporation of a refrigerant circulating through an inside of the centralized energy module with the coolant circulating in the second line, the fourth line, and the sixth line.

2. The system of claim 1, wherein the first valve comprises:
   a first port through which the coolant cooled by the radiator is introduced;
   a second port through which the coolant is discharged to the radiator;
   a third port through which the coolant is introduced from the second line;
   a fourth port through which the coolant is discharged to the second line;
   a fifth port through which the coolant is introduced from the fourth line; and
   a sixth port through which the coolant is discharged to the fourth line.

3. The system of claim 2, wherein:
   the first water pump is provided in the fourth port of the first valve; and
   the second water pump is provided in the sixth port of the first valve.

4. The system of claim 1, wherein the third circuit and the fifth circuit are disposed in parallel through the second circuit and the fourth circuit.

5. The system of claim 4, wherein the second valve comprises:
   a first port through which the coolant is introduced from the third valve through the second line;
   a second port that is connected to the second line that is connected to the condenser and through which the coolant is discharged to the condenser through the second line;
   a third port through which the coolant that has passed through the electrical equipment is introduced through the third line;
   a fourth port through which the coolant is discharged to the electrical equipment through the third line;
   a fifth port through which the coolant is introduced through the sixth line; and
   a sixth port through which the coolant is discharged to the sixth line.

6. The system of claim 5, wherein the sixth port of the second valve is provided with the third water pump.

7. The system of claim 5, wherein the third valve comprises:
   a first port through which the coolant is introduced from the first valve through the second line;
   a second port through which the coolant is discharged to the second valve through the second line;
   a third port through which the coolant is introduced from the second valve through the sixth line;
   a fourth port through which the coolant is discharged to the evaporator through the sixth line;
   a fifth port through which the coolant that has passed through the heater is introduced through the seventh line; and
   a sixth port through which the coolant is discharged to the fourth valve through the seventh line.

8. The system of claim 7, wherein the fourth valve comprises:
   a first port through which the coolant is introduced through the fourth line;
   a second port through which the coolant is discharged to the first valve through the fourth line;
   a third port through which the coolant is introduced from the third valve through the seventh line;
   a fourth port through which the coolant is discharged to the heater through the seventh line;
   a fifth port through which the coolant that has passed through the battery module is introduced through the fifth line; and
   a sixth port through which the coolant is discharged to the battery module through the fifth line.

9. The system of claim 8, wherein the fourth port of the fourth valve is provided with the fourth water pump.

10. The system of claim 8, wherein the sixth circuit comprises a branch line configured to selectively separate the sixth line and the cooler through a fifth valve provided in the sixth line between the evaporator and the cooler to selectively block the coolant that has passed through the evaporator from being introduced into the cooler.

11. The system of claim 10, wherein the fifth valve is configured to:
open the branch line and close a part of the sixth line that is connected to the cooler to prevent the coolant from being introduced into the cooler in a heating mode of the vehicle; and
close the branch line and open a part of the sixth line that is connected to the cooler in a cooling mode or in a heating and dehumidification mode of the vehicle.

12. The system of claim 10, wherein, when the electrical equipment and the battery module are cooled using the coolant:
the first line that is connected to the first port of the first valve is connected to the fourth line that is connected to the sixth port of the first valve;
the fourth line that is connected to the first port of the fourth valve is connected to the fifth line that is connected to the sixth port of the fourth valve;
the fifth line passing through the battery module and connected to the fifth port of the fourth valve is connected to the fourth line that is connected to the second port of the fourth valve;
the fourth line that is connected to the second port of the fourth valve is connected to the second line from the fifth port of the first valve through the fourth port of the first valve;
the second line that is connected to the fourth port of the first valve is connected to the first port of the second valve from the first port of the third valve through the second port of the third valve;
the second line that is connected to the first port of the second valve is connected to the third line that is connected to the fourth port of the second valve from the first port of the second valve;
the third line passing through the electrical equipment and connected to the third port of the second valve is connected to the second line through the second port of the second valve;
the second line that is connected to the third port of the first valve is connected to the first line that is connected to the second port of the first valve;
the first water pump and the second water pump are configured to be operated so that the coolant cooled by the radiator is circulated along the first line, the second line, the third line, the fourth line, and the fifth line; and
operations of the sixth circuit, the seventh circuit, and the centralized energy module are stopped.

13. The system of claim 10, wherein, when the electric equipment and the battery module are cooled in a cooling mode of the vehicle:
the first line that is connected to the first port of the first valve is connected to the second line that is connected to the fourth port of the first valve;
the second line that is connected to the fourth port of the first valve is connected to the first port of the second valve through the first port of the third valve and the second port of the third valve;
the second line that is connected to the first port of the second valve is connected to the third line that is connected to the fourth port of the second valve from the first port of the second valve;
the third line passing through the electrical equipment and connected to the third port of the second valve is connected to the second line through the second port of the second valve;
the second line passing through the condenser and connected to the third port of the first valve is connected to the first line that is connected to the second port of the first valve;
the first water pump is configured to be operated so that the coolant cooled by the radiator circulates along the first line, the second line, and the third line;
in the fourth circuit, the fourth line that is connected to the sixth port of the first valve passes through the chiller, and then is connected to the fifth line that is connected to the sixth port of the fourth valve from the first port of the fourth valve;
the fifth line that passes through the battery module and is connected to the fifth port of the fourth valve is connected to the fourth line that is connected to the second port of the fourth valve from the fifth port of the fourth valve;
the fourth line that is connected to the second port of the fourth valve is connected to the chiller through the fifth port of the first valve and the sixth port of the first valve;
the second water pump is configured to be operated so that the coolant is independently circulated from the fourth circuit along the fifth circuit;
in the sixth circuit, the sixth line defines an independent closed circuit through the fifth port and the sixth port of the second valve and the third port and the fourth port of the third valve so that the coolant circulates independently along the sixth line through operation of the third water pump; and
operation of the seventh circuit is stopped and the refrigerant is circulated in the centralized energy module.

14. The system of claim 10, wherein, when an external heat source and waste heat of the electrical equipment are recovered in a heating mode of the vehicle:
the first line that is connected to the first port of the first valve is connected to the fourth line that is connected to the sixth port of the first valve;
the fourth line that passes through the chiller and is connected to the first port of the fourth valve is connected from the second port of the fourth valve to the fifth port of the first valve;
the fourth line that is connected to the fifth port of the first valve is connected to the first line that is connected to the second port of the first valve from the fifth port of the first valve;
the first circuit and the fourth circuit are connected, and the second water pump is configured to be operated so that the coolant that has passed through the radiator is circulated along the first line and the fourth line;
the second line that is connected to the fourth port of the first valve is connected to the seventh line that is connected to the sixth port of the third valve from the first port of the third valve;
the seventh line that is connected to the sixth port of the third valve passes through the heater from the third port of the fourth valve through the fourth port of the fourth valve, and then is connected to the fifth port of the third valve;
the seventh line that is connected to the fifth port of the third valve is connected to the second line that is connected to the second port of the third valve;
the second line that is connected to the second port of the third valve passes through the condenser from the first port of the second valve through the second port of the second valve, and then is connected to the third port of the first valve, the second circuit is connected to the seventh circuit, and the first water pump and the fourth water pump are each configured to be operated so that the coolant is circulated along the second line and the seventh line;

the third line that is connected to the third port of the second valve is connected to the sixth line that is connected to the sixth port of the second valve;

the sixth line that is connected to the sixth port of the second valve passes through the evaporator from the third port of the third valve through the fourth port of the third valve, and then is connected to the branch line opened by operation of the fifth valve;

a part of the sixth line that is connected to the branch line is connected to the third line from the fifth port of the second valve through the fourth port of the second valve without passing through the cooler;

the third line that is connected to the fourth port of the second valve passes through the electrical equipment and is connected to the third port of the second valve;

the third circuit is connected to the fifth circuit, and the third water pump is configured to be operated so that the coolant is circulated along the third line and the sixth line; and the operation of the fifth circuit is stopped and the refrigerant is circulated in the centralized energy module.

15. The system of claim 10, wherein, when waste heat of the electrical equipment and the battery module is recovered in a heating mode of the vehicle:

operation of the first circuit is stopped;

in the fourth circuit, the fourth line that is connected to the sixth port of the first valve passes through the chiller, and then is connected to the fifth line that is connected to the sixth port of the fourth valve from the first port of the fourth valve;

the fifth line that passes through the battery module and is connected to the fifth port of the fourth valve is connected to the fourth line that is connected to the second port of the fourth valve from the fifth port of the fourth valve;

the fourth line that is connected to the second port of the fourth valve is connected to the chiller through the fifth port of the first valve and the sixth port of the first valve;

the second water pump is configured to be operated so that the coolant is independently circulated from the fourth circuit along the fifth circuit;

the second line that is connected to the fourth port of the first valve is connected to the seventh line that is connected to the sixth port of the third valve from the first port of the third valve;

the seventh line that is connected to the sixth port of the third valve passes through the heater from the third port of the fourth valve through the fourth port of the fourth valve, and then is connected to the fifth port of the third valve;

the seventh line that is connected to the fifth port of the third valve is connected to the second line that is connected to the second port of the third valve;

the second line that is connected to the second port of the third valve passes through the condenser from the first port of the second valve through the second port of the second valve, and then is connected to the third port of the first valve;

the second circuit is connected to the seventh circuit, and the first water pump and the fourth water pump are each configured to be operated so that the coolant is circulated along the second line and the seventh line;

the third line that is connected to the third port of the second valve is connected to the sixth line that is connected to the sixth port of the second valve;

the sixth line that is connected to the sixth port of the second valve passes through the evaporator from the third port of the third valve through the fourth port of the third valve, and then is connected to the branch line opened by operation of the fifth valve;

a part of the sixth line that is connected to the branch line is connected to the third line from the fifth port of the second valve through the fourth port of the second valve without passing through the cooler;

the third line that is connected to the fourth port of the second valve passes through the electrical equipment and is connected to the third port of the second valve;

the third circuit is connected to the fifth circuit, and the third water pump is configured to be operated so that the coolant is circulated along the third line and the sixth line; and the refrigerant is circulated in the centralized energy module.

16. The system of claim 10, wherein, when an external heat source is recovered in a heating and dehumidification mode of the vehicle:

the first line that is connected to the first port of the first valve is connected to the fourth line that is connected to the sixth port of the first valve;

the fourth line that passes through the chiller and is connected to the first port of the fourth valve is connected from the second port of the fourth valve to the fifth port of the first valve;

the fourth line that is connected to the fifth port of the first valve is connected to the first line that is connected to the second port of the first valve from the fifth port of the first valve;

the first circuit and the fourth circuit are connected, and the second water pump is configured to be operated so that the coolant that has passed through the radiator is circulated along the first line and the fourth line;

the second line that is connected to the fourth port of the first valve is connected to the seventh line that is connected to the sixth port of the third valve from the first port of the third valve;

the seventh line that is connected to the sixth port of the third valve passes through the heater from the third port of the fourth valve through the fourth port of the fourth valve, and then is connected to the fifth port of the third valve;

the seventh line that is connected to the fifth port of the third valve is connected to the second line that is connected to the second port of the third valve;

the second line that is connected to the second port of the third valve passes through the condenser from the first port of the second valve through the second port of the second valve, and then is connected to the third port of the first valve;

the second circuit is connected to the seventh circuit, and the first water pump and the fourth water pump are each configured to be operated so that the coolant is circulated along the second line and the seventh line;

in the sixth circuit, the sixth line defines an independent closed circuit by the sixth port of the second valve, the third port of the third valve, the fourth port of the third valve, and the fifth port of the second valve;

the third water pump is configured to be operated so that the coolant is sequentially passed through the evaporator and the cooler along the sixth line; and the refrigerant is circulated in the centralized energy module.

17. The system of claim 10, wherein, when an external heat source and waste heat of the electrical equipment are recovered to heat the battery module in a heating mode of the vehicle:

the first line that is connected to the first port of the first valve is connected to the fourth line that is connected to the sixth port of the first valve;

the fourth line that passes through the chiller and is connected to the first port of the fourth valve is connected from the second port of the fourth valve to the fifth port of the first valve;

the fourth line that is connected to the fifth port of the first valve is connected to the first line that is connected to the second port of the first valve from the fifth port of the first valve;

the first circuit and the fourth circuit are connected, and the second water pump is configured to be operated so that the coolant that has passed through the radiator circulates along the first line and the fourth line;

the second line that is connected to the fourth port of the first valve is connected to the seventh line that is connected to the sixth port of the third valve from the first port of the third valve;

the seventh line that is connected to the sixth port of the third valve is connected to the fifth line from the third port of the fourth valve through the sixth port of the fourth valve;

the fifth line that passes through the battery module and is connected to the fifth port of the fourth valve is connected from the fifth port of the fourth valve to the seventh line that is connected to the fourth port of the fourth valve;

the seventh line that is connected to the fourth port of the fourth valve passes through the heater, and then is connected to the fifth port of the third valve;

the seventh line that is connected to the fifth port of the third valve is connected to the second line that is connected to the second port of the third valve;

the second line that is connected to the second port of the third valve passes through the condenser from the first port of the second valve through the second port of the second valve, and then is connected to the third port of the first valve;

the second circuit is connected to the fifth circuit and the seventh circuit, and the first water pump and the fourth water pump are each configured to be operated so that the coolant is circulated along the second line, the fifth line, and the seventh line;

the third line that is connected to the third port of the second valve is connected to the sixth line that is connected to the sixth port of the second valve;

the sixth line that is connected to the sixth port of the second valve passes through the evaporator from the third port of the third valve through the fourth port of the third valve, and then is connected to the branch line opened by operation of the fifth valve;

a part of the sixth line that is connected to the branch line is connected to the third line from the fifth port of the second valve through the fourth port of the second valve without passing through the cooler;

the third line that is connected to the fourth port of the second valve passes through the electrical equipment and is connected to the third port of the second valve;

the third circuit is connected to the fifth circuit, and the third water pump is configured to be operated so that the coolant is circulated along the third line and the sixth line; and the refrigerant is circulated in the centralized energy module.

18. The system of claim 10, wherein, when a heating mode of the vehicle is performed with waste heat of the electrical equipment:

the first circuit, the fourth circuit, the fifth circuit, and the sixth circuit are stopped;

the second line that is connected to the fourth port of the first valve is connected to the seventh line that is connected to the sixth port of the third valve from the first port of the third valve;

the seventh line that is connected to the sixth port of the third valve passes through the heater from the third port of the fourth valve through the fourth port of the fourth valve, and then is connected to the fifth port of the third valve;

the seventh line that is connected to the fifth port of the third valve is connected to the second line that is connected to the second port of the third valve;

the second line that is connected to the second port of the third valve is connected to the first port of the second valve;

the second line that is connected to the first port of the second valve is connected to the third line that is connected to the fourth port of the second valve from the first port of the second valve;

the third line that passes through the electrical equipment and is connected to the third port of the second valve is connected to the second line through the second port of the second valve;

the second line that passes through the condenser and is connected to the third port of the first valve is connected to the second line that is connected to the first port of the third valve from the third port of the first valve through the fourth port of the first valve;

the second circuit is connected to the seventh circuit and the third circuit, and the first water pump and the fourth water pump are each configured to be operated so that the coolant is circulated along the second line, the seventh line, and the third line; and operation of the centralized energy module is stopped.

19. The system of claim 10, wherein, when the electrical equipment and the battery module are heated:

the first circuit, the sixth circuit, and the seventh circuit are stopped;

the second line that is connected to the fourth port of the first valve is connected to the first port of the second valve from the first port of the third valve through the second port of the third valve;

the second line that is connected to the first port of the second valve is connected to the third line that is connected to the fourth port of the second valve from the first port of the second valve;

the third line that passes through the electrical equipment and is connected to the third port of the second valve is connected to the second line through the second port of the second valve;

the second line that is connected to the second port of the second valve is connected from the third port of the first valve to the fourth line that is connected to the sixth port of the first valve;

the fourth line is connected from the first port of the fourth valve to the fifth line that is connected to the sixth port of the fourth valve;

the fifth line that passes through the battery module and is connected to the fifth port of the fourth valve is connected to the fourth line that is connected to the second port of the fourth valve from the fifth port of the fourth valve;

the fourth line that is connected to the second port of the fourth valve is connected to the second line from the fifth port of the first valve through the fourth port of the first valve;

the second circuit is connected to the third circuit, the fourth circuit, and the fifth circuit, and the first water pump and the second water pump are each configured to be operated such that the coolant is circulated along the second line, the third line, the fourth line, and the fifth line; and operation of the centralized energy module is stopped.

20. The system of claim 1, wherein the centralized energy module comprises:
 a compressor connected to a refrigerant line and configured to compress the refrigerant;
 the condenser connected to the compressor through the refrigerant line and configured to condense the refrigerant by performing heat exchange between the coolant circulating in the second line and the refrigerant;
 a first expansion valve connected to the condenser through the refrigerant line and configured to expand the refrigerant;
 the evaporator connected to the first expansion valve through the refrigerant line and configured to evaporate the refrigerant by performing heat exchange between the coolant circulating in the sixth line and the refrigerant;
 an accumulator provided in the refrigerant line between the evaporator and the compressor;
 a refrigerant connection line having a first end connected to the refrigerant line that is connected to the condenser so that the refrigerant discharged from the condenser is selectively introduced and a second end connected to the accumulator to introduce the refrigerant into the compressor together with the refrigerant discharged from the evaporator;
 a second expansion valve provided in the refrigerant connection line and configured to selectively introduce the refrigerant discharged from the condenser into the refrigerant connection line and to selectively expand the refrigerant introduced into the refrigerant connection line; and
 the chiller provided in the refrigerant connection line so that the refrigerant that has passed through the second expansion valve is introduced into the chiller and configured to perform heat exchange between the coolant circulating in the fourth line and the refrigerant.

* * * * *